United States Patent
Takagi et al.

(10) Patent No.: US 8,744,448 B2
(45) Date of Patent: Jun. 3, 2014

(54) RADIO BASE STATION DEVICE, HANDOVER CONTROL SYSTEM, AND HANDOVER CONTROL METHOD

(75) Inventors: Masaki Takagi, Fukuoka (JP); Tsuyoshi Shida, Fukuoka (JP)

(73) Assignee: Panasonic Corporation, Osaka (JP)

(*) Notice: Subject to any disclaimer, the term of this patent is extended or adjusted under 35 U.S.C. 154(b) by 315 days.

(21) Appl. No.: 13/322,878

(22) PCT Filed: Jun. 9, 2010

(86) PCT No.: PCT/JP2010/003854
§ 371 (c)(1),
(2), (4) Date: Nov. 28, 2011

(87) PCT Pub. No.: WO2011/154999
PCT Pub. Date: Dec. 15, 2011

(65) Prior Publication Data
US 2012/0190370 A1    Jul. 26, 2012

(51) Int. Cl.
*H04W 36/00*    (2009.01)
(52) U.S. Cl.
USPC .......................................................... 455/437
(58) Field of Classification Search
USPC ........ 455/437, 436, 435.1, 458, 435.2, 426.1, 455/432.1, 445, 456.3, 515, 552.1, 553.1, 455/567; 370/331, 338
See application file for complete search history.

(56) References Cited

U.S. PATENT DOCUMENTS

| | | | | |
|---|---|---|---|---|
| 6,163,843 A * | 12/2000 | Inoue et al. | ...................... | 726/11 |
| 6,799,036 B2 * | 9/2004 | Doi et al. | .................... | 455/432.1 |
| 7,142,879 B2 * | 11/2006 | Watanabe et al. | ............. | 455/458 |
| 7,328,014 B2 * | 2/2008 | Takeda et al. | .............. | 455/435.1 |
| 7,564,817 B2 * | 7/2009 | Abeta et al. | .................... | 370/331 |
| 7,684,796 B2 * | 3/2010 | Mizukoshi | ..................... | 455/433 |

(Continued)

FOREIGN PATENT DOCUMENTS

| | | |
|---|---|---|
| JP | 11-041649 A | 2/1999 |
| JP | 2002-125254 A | 4/2002 |
| JP | 2003-324761 A | 11/2003 |
| JP | 2005-348247 | 12/2005 |
| JP | 2007-074260 A | 3/2007 |
| JP | 2009-177620 | 8/2009 |
| JP | 2010-517411 A | 5/2010 |
| WO | 2008/013218 | 1/2008 |
| WO | 2008/029732 | 3/2008 |

OTHER PUBLICATIONS

International Search Report dated Sep. 14, 2010.

*Primary Examiner* — Melody Mehrpour
(74) *Attorney, Agent, or Firm* — Seed IP Law Group PLLC

(57) ABSTRACT

A radio cell station CS that relays a call connection of a radio personal station PS to a management device ME, includes: a call connection control section that controls the call connection of the radio personal station PS; and a position registration request section that requests, of the management device ME, a position registration that associates identification information on the radio personal station PS with identification information on the radio cell station CS. When a request for handover from a radio cell station CS3 to a radio cell station CS4 is received from the radio personal station PS that conducts the call connection through the radio cell station CS, the call connection of the radio personal station PS goes through the radio cell station CS4 and the radio cell station CS2 under control. While the call connection going through the radio cell station CS2 is being conducted, the position registration is not requested of the management device ME. When the call connection going through the radio cell station CS4 and the radio cell station CS2 is ended, the position registration is requested of the management device ME.

9 Claims, 32 Drawing Sheets

(56) References Cited

U.S. PATENT DOCUMENTS

| | | |
|---|---|---|
| 8,498,265 B2 * | 7/2013 | Rantanen et al. ............ 370/331 |
| 2002/0045450 A1 | 4/2002 | Shimizu et al. |
| 2002/0181437 A1 | 12/2002 | Ohkubo et al. |
| 2008/0291874 A1 | 11/2008 | Bae et al. |
| 2009/0290529 A1 | 11/2009 | Toyokawa |
| 2010/0002652 A1 | 1/2010 | Kawakami |
| 2010/0082796 A1 * | 4/2010 | Akiyoshi ...................... 709/223 |
| 2010/0290432 A1 | 11/2010 | Kurita |
| 2011/0019647 A1 * | 1/2011 | Fujino .......................... 370/331 |
| 2011/0149839 A1 | 6/2011 | Toyokawa |

* cited by examiner

RADIO BASE STATION DEVICE, HANDOVER CONTROL SYSTEM, AND HANDOVER CONTROL METHOD

TECHNICAL FIELD

The present invention relates to a radio base station device that can realize seamless handover when communication is conducted with radio connection in a multi-cell system, a handover control system using the radio base station device, and a handover control method.

BACKGROUND ART

Up to now, when communication is conducted with radio connection in a multi-cell system (cellular system), a radio terminal communicates with a radio base station having a matched service set identifier (SSID). Then, when the radio terminal travels while calling the radio base station, electric waves become weaker with increasing distance from a center of a cell (wireless area), and a signal strength and a power level are changed. In this situation, when electric waves from another radio base station of an adjacent cell become more intense, call can be continued if the communication is switched to communication with this radio base station. This is called "handover".

In order that the radio terminal accesses to a new radio base station, the radio terminal must search identifiers of a large number of radio base stations corresponding to connection candidates or having connection histories in order, and acquire a connectable radio base station. Further, radio base station cannot conduct communication through a network unless the radio base station registers information on itself and the subject radio terminal in a registration server of an IP network.

FIG. 32 is an illustrative diagram illustrating a conventional handover of a radio terminal. An IP network (network communicatable in IP) is connected with a management device ME having the registration server therein. Also, the management device ME is connected with radio base stations (hereinafter referred to as "radio cell stations") CS1, CS2, CS3, CS4, and CS5 under its control, which each radiate electric waves to form a cell, and form a communication area as a whole. Radio terminals (hereinafter referred to as "radio personal stations") PSs include a PHS (personal handy-phone system) terminal, a DECT (digital enhanced cordless telecommunication) terminal, other cellular phones, and a radio LAN (local area network). Anyway, each of the personal stations conducts a digital radio communication with any radio cell station. A voice data communication between each of the radio personal stations and a partner terminal conforms to an IP call control protocol such as an SIP (session initiation protocol) or H.323, and is conducted with the use of RTP/RTCP.

In order that the radio personal station PS connected to the radio cell station CS1 is connected to an IP terminal of an intended party through the IP network, the management server such as an SIP server needs to recognize which radio cell station CS is connected to the radio personal station PS at present. For that reason, the radio cell station CS1 transmits a REGISTER (position registration request) to the registration server of the SIP server, and registers identification information such as its own IP address and an identifier (telephone number) of the radio personal station PS in the registration server.

Accordingly, when the radio personal station PS travels from a cell of the radio cell station CS1 to another cell (radio cell station CS3) during a call, the radio personal station PS cannot continue the call unless the radio connection is switched from CS1 to CS3. For that reason, handover is conducted, and in conducting the handover, the radio cell station CS3 transmits the REGISTER (position registration request) to the registration sever, and registers the position of a new radio cell station CS3. As a result, the radio cell station CS3 allows the registration server to recognize disconnection and reconnection. In this situation, unless smooth handover is conducted, the call is disconnected to deteriorate a call quality.

Likewise, thereafter, every time the radio personal station PS travels from a cell of the radio cell station CS3 to a cell of the radio cell station CS4, from the cell of the radio cell station CS4 to a cell of the radio cell station CS5, and from the cell of the radio cell station CS 5 to the cell of the radio cell station CS2, the radio cell stations CS4, CS5, and CS2 transmit REGISTER, and repeat the position registration in the registration server. The call cannot be continued unless the position registration is conducted. However, it takes time to conduct the handover, and when reconnection fails, the radio personal station PS must again search the radio cell station CS for reconnection.

Up to now, a technology has been proposed in which handover is conducted when a user travels from an area of one MGW (media gateway) currently connected to his cellular phone to an area of another MGW while calling by the cellular phone through an IMS (IP multimedia subsystem) (refer to JP-A 2009-177620).

When a termination (TDM/1) of a first communication system is calling a termination (RTP/1) of a second communication system within one MGW 1, a mobile station travels to an area falling under the control of another MGW 2. In this state, a context of a termination (RTP/11) of the first communication system is added to a context of the MGW 1 that is a handover source. Further, a context for connecting a termination (TDM/2) of the first communication system and a termination (RTP/2) of the second communication system is added to a context within the MGW 2. It is assumed that the TDM/1 and the RTP/11 are one-way stream, and downstream with respect to the MGW 2.

In a handover switching state, the RTP/1 and the TDM/1 are changed to one-way stream, and the RTP/1 and the RTP/11 are changed to two-way stream to conduct the switching of the streams of a source and a destination. Finally, in a handover completion state, only the termination (TDM/1) is released, and the termination (RTP/1) is continuously used as an anchor.

PRIOR ART DOCUMENT

Patent Document

Patent Document 1: JP-A-2009-177620

SUMMARY OF THE INVENTION

Problem to be Solved by the Invention

Up to now, when the traveling radio terminal travels while repeating the handover, call is disconnected once and then reconnected. Therefore, there has been required a process for allowing the SIP and the other registration server to recognize disconnection and reconnection. Accordingly, every time the radio station travels from a cell of one radio base station to a cell of another base station, the call is not continued unless the position registration is conducted. It takes time to repeat the position registration during handover, and the call quality is largely deteriorated.

In the technology of Patent document 1, when the handover occurs while communication is conducted between the first communication system such as the IP and the second communication system such as the radio communication through a certain MGW, a handover destination communicates by the first communication system through an handover source. Accordingly, one MGW is fixedly used, and a mobile communication exchange repetitively transmits and receives a request and a reply with respect to the source and the destination during the handover, and recognizes the position of the destination. However, Patent document 1 fails to disclose how the mobile communication exchange recognizes the switching of the MGW. Also, the repetition of handover requires much time, and the call quality is deteriorated by handover. However, those problems are not solved.

Under the circumstances, the present invention aims at providing a radio base station device, a handover control system, and a handover control method, which can realize seamless handover while reducing the number of position registrations during a call, without making a management device and a partner terminal aware of handover.

Means for Solving the Problems

For the purpose of solving the above problems, according to the present invention, as a main feature, there is provided a radio base station device that relays a call connection of a radio terminal to a management device, comprising: a call connection control section for controlling the call connection of the radio terminal; and a position registration request section for requesting, of the management device, a position registration that associates identification information on the radio terminal with identification information on the radio base station device, wherein if the call connection control section receives a handover request from the radio terminal that conducts the call connection through another radio base station device, then the call connection control section controls the call connection of the radio terminal in such a manner that the radio base station device and the another radio base station device both relay the call connection of the radio terminal to the management device, and wherein while the radio base station device and the another radio base station device both relay the call connection of the radio terminal to the management device, the position registration request section does not request the position registration of the management device, and if the call connection relayed, to the management device, by both the radio base station device and the another radio base station device is ended, then the position registration request section requests the position registration of the management device.

Advantageous Effects of the Invention

According to the present invention, the radio base station device, the handover control system, and the handover control method can realize seamless handover while reducing the number of position registrations during a call, without making a management device and a partner terminal aware of handover.

MODES FOR CARRYING OUT THE INVENTION

Figure 1:
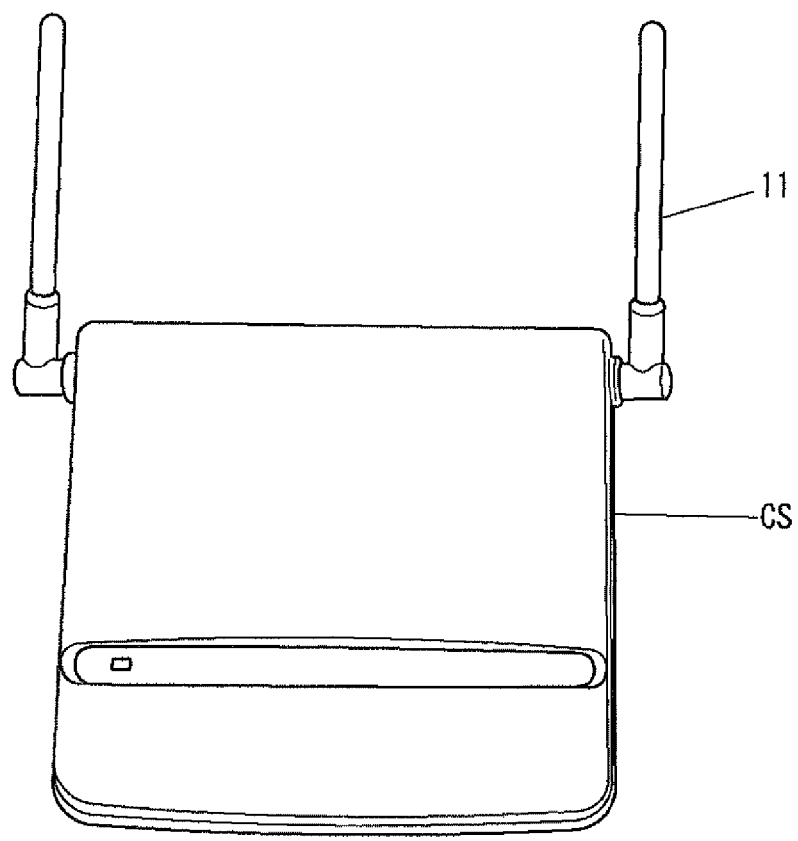
FIG. 1 is a schematic diagram of a radio base station device according to a first embodiment of the present invention.

According to a first aspect of the present invention, there is provided a radio base station device that relays a call connection of a radio terminal to a management device, comprising: a call connection control section for controlling the call connection of the radio terminal; and a position registration request section for requesting, of the management device, a position registration that associates identification information on the radio terminal with identification information on the radio base station device, wherein if the call connection control section receives a handover request from the radio terminal that conducts the call connection through another radio base station device, then the call connection control section controls the call connection of the radio terminal in such a manner that the radio base station device and the another radio base station device both relay the call connection of the radio terminal to the management device, and wherein while the radio base station device and the another radio base station device both relay the call connection of the radio terminal to the management device, the position registration request section does not request the position registration of the management device, and if the call connection relayed, to the management device, by both the radio base station device and the another radio base station device is ended, then the position registration request section requests the position registration of the management device. With this configuration, seamless handover can be realized while reducing the number of position registrations during a call, without making the management device ME and the partner terminal aware of handover.

According to a second aspect of the present invention, in the radio base station device according to the first aspect, a call formed by the call connection includes at least one of a voice call and a data call. With this configuration, the seamless handover can be realized to perform a high-quality call using the radio terminal.

According to a third aspect of the present invention, in the radio base station device according to the first or second aspect, the call connection control section controls a plurality of call connections generated by respective radio terminals at the same time for at least a given time, and the position registration request section does not request the position registration of the management device while at least one of the call connections is conducted, and requests the position registration of the management device if all of the plurality of call connections are ended. With this configuration, even if the plurality of call connections occur, the seamless handover can be realized while reducing the number of position registrations during a call, without making the management device ME and the partner terminal aware of handover.

According to a fourth aspect of the present invention, in the radio base station device according to the third aspect, the call formed by the plurality of call connections controlled at the same time includes at least one call state. With this configuration, if a plurality of call connections occurs, a conference call connection or a teleconference can be provided.

According to a fifth aspect of the present invention, in the radio base station device according to the fourth aspect, the call formed by the plurality of call connections controlled at the same time further includes a hold state. With this configuration, if a second call connection occurs, another call connection is put on hold, and the call connections can be switched to one call connection.

According to a sixth aspect of the present invention, in the radio base station device according to the first or second aspect, the call connection control section requests the handover if a reception level of a signal strength becomes a threshold value or lower. With this configuration, the handover can be conducted immediately according to a change in the reception level, which can be moreover realized without being aware of this.

According to a seventh aspect of the present invention, in the radio base station device according to the first or second aspect, a call connection control section of the another radio base station device issues a position registration deletion notice to the radio base station device if the call connection that goes through the another radio base station device and the radio base station device is ended.

According to an eighth aspect of the present invention, there is provided a handover control system comprising: a management device for being connectable to a network; and a plurality of radio base station devices for being connectable to a radio terminal respectively and for relaying a call connection of the radio terminal to the management device, wherein a handover control is conducted if the radio terminal travels from a wireless area of a first radio base station device to a wireless area of a second radio base station device among the plurality of radio base station devices, and wherein each of the radio base station devices includes: a call connection control section for controlling the call connection of the radio terminal; and a position registration request section for requesting, of the management device, a position registration that associates identification information on the radio terminal with identification information on the second radio base station device, wherein if the call connection control section receives a handover request from the radio terminal that conducts the call connection through the first radio base station device, then the call connection control section controls the call connection of the radio terminal in such a manner that the first radio base station device and the second radio base station device both relay the call connection of the radio terminal to the management device, and wherein while the first radio base station device and the second radio base station device both relay the call connection of the radio terminal to the management device, the position registration request section does not request the position registration of the management device, and if the call connection relayed, to the management device, by both the first radio base station device and the second base station device is ended, then the position registration request section requests the position registration of the management device. With this configuration, seamless handover can be realized while reducing the number of position registrations during a call, without making the management device ME and the partner terminal aware of handover.

According to a ninth aspect of the present invention, there is provided a handover control method in which a call connection of a radio terminal is relayed by one of a plurality of radio base station devices to a management device, the method comprising: if receiving, from the radio terminal, a request for handover from the call connection going through a first radio base station device to the call connection going through a second radio base station device, connecting the call connection of the radio terminal to the management device through both the first radio base station device and the second radio base station device; and requesting no position registration that associates identification information on the radio terminal with identification information on the second radio base station device while the call connection going through both the first radio base station device and the second radio base station device is conducted, and requesting the position registration of the management device if the call connection going through both the first radio base station device and the second radio base station device is ended. With this configuration, seamless handover can be realized while reducing the number of position registrations during a call, without making the management device ME and the partner terminal aware of handover.

Hereinafter, a first embodiment of the present invention will be described with reference to the drawings.

First Embodiment

Figure 2:
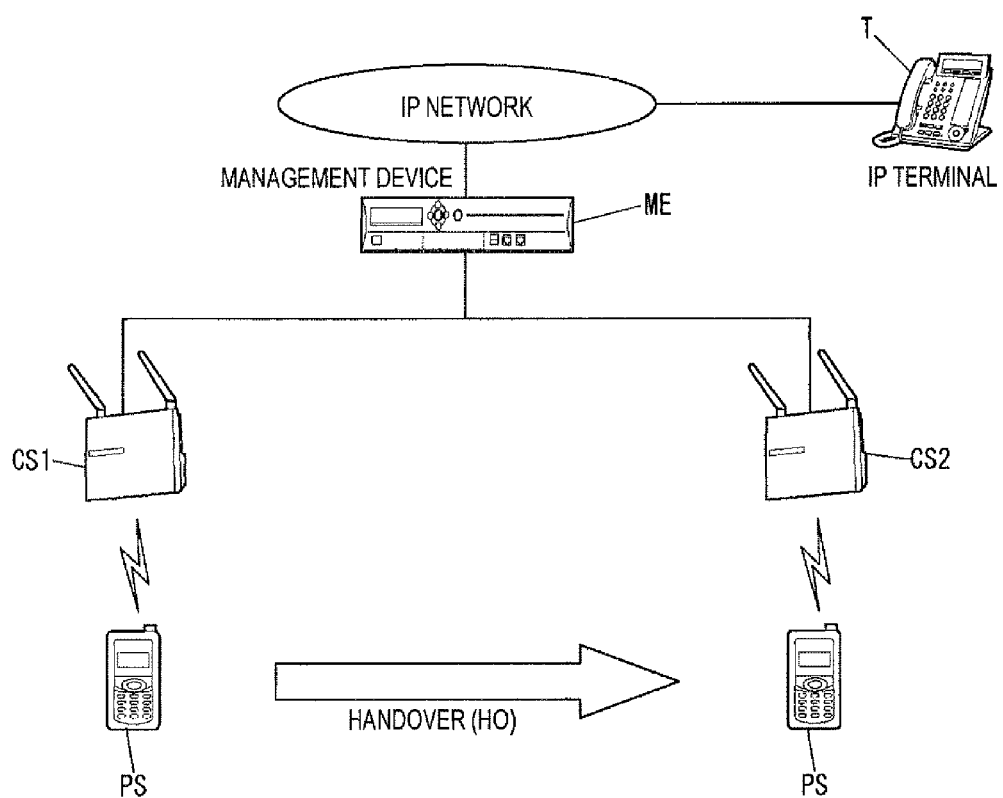
FIG. 2 is a configuration diagram of a network in which the radio base station device is arranged according to the first embodiment of the present invention.
Figure 3:
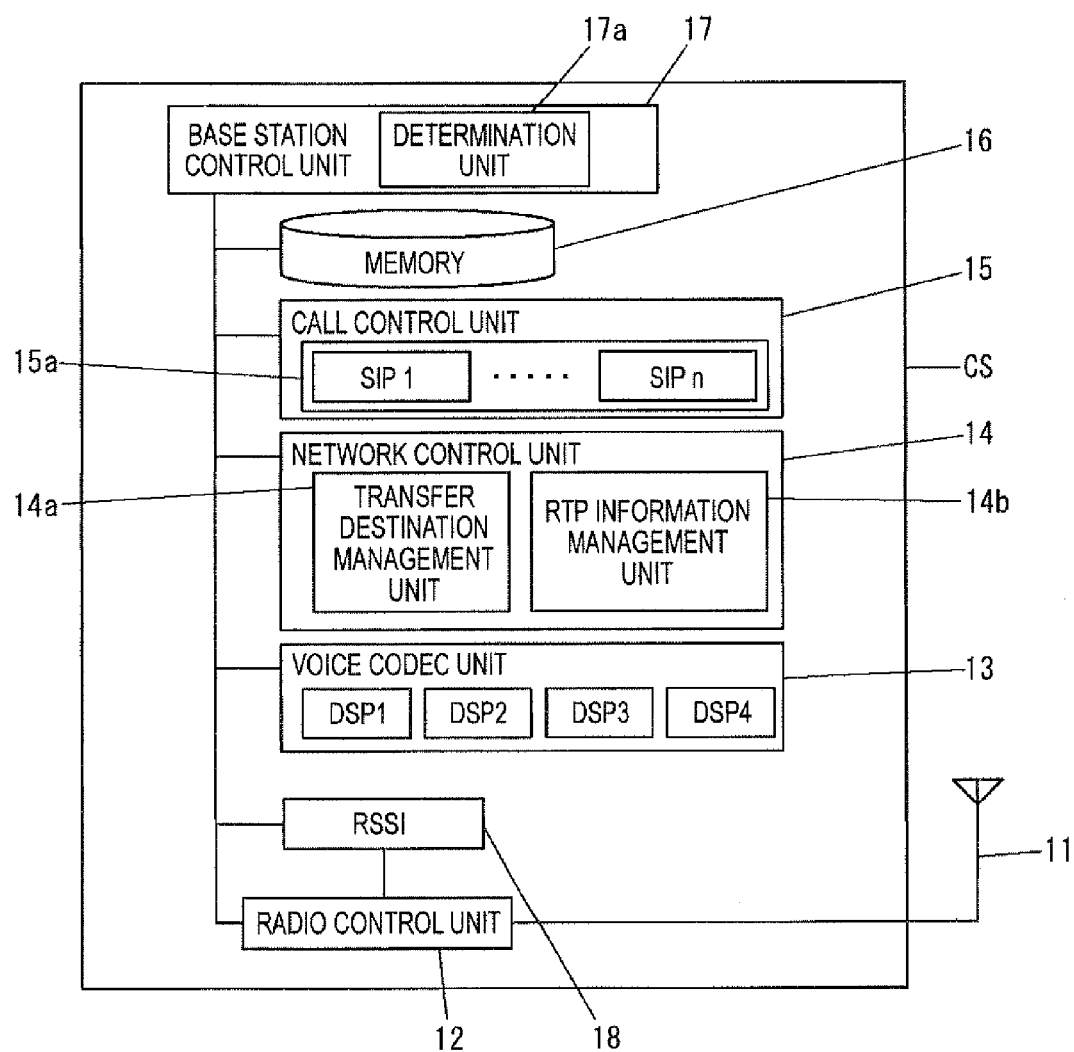
FIG. 3 is a configuration diagram of the radio base station device according to the first embodiment of the present invention.
Figure 4:
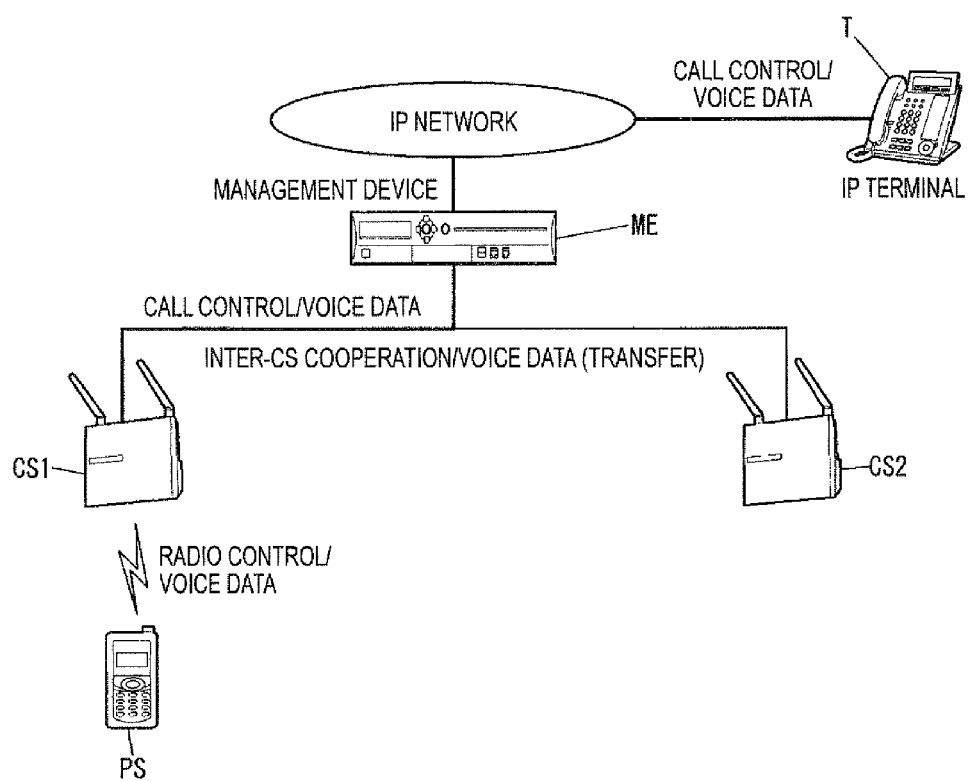
FIG. 4 is an illustrative diagram of the network in which the radio base station device is arranged before handover is conducted according to the first embodiment of the present invention.
Figure 5:
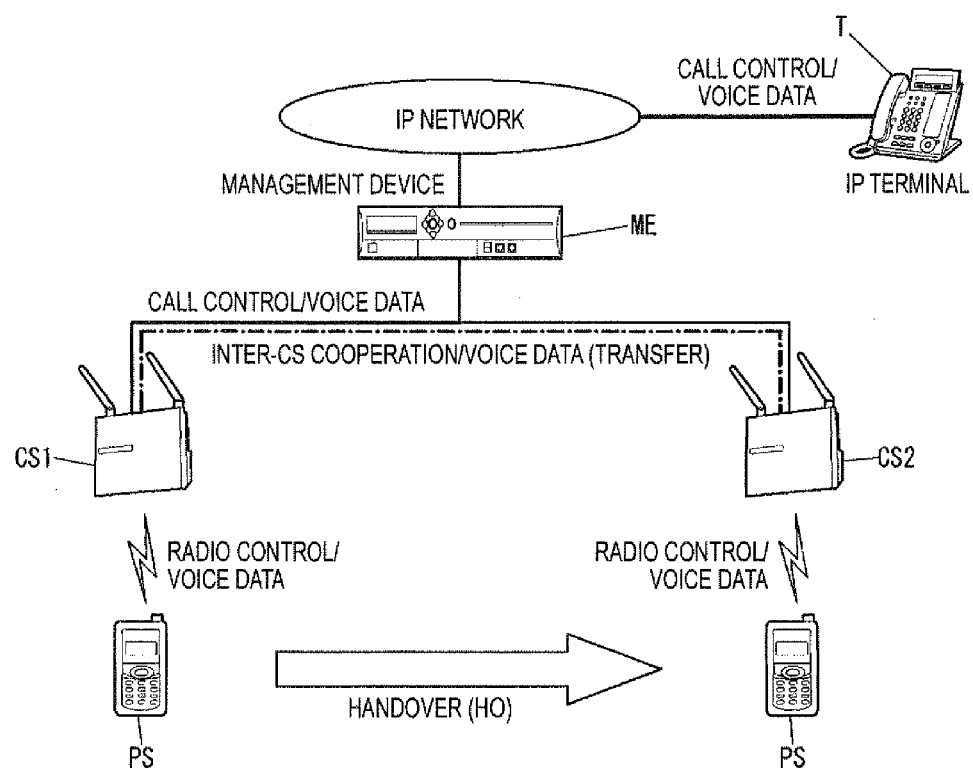
FIG. 5 is an illustrative diagram of the network in which the radio base station device is arranged during handover according to the first embodiment of the present invention.
Figure 6:
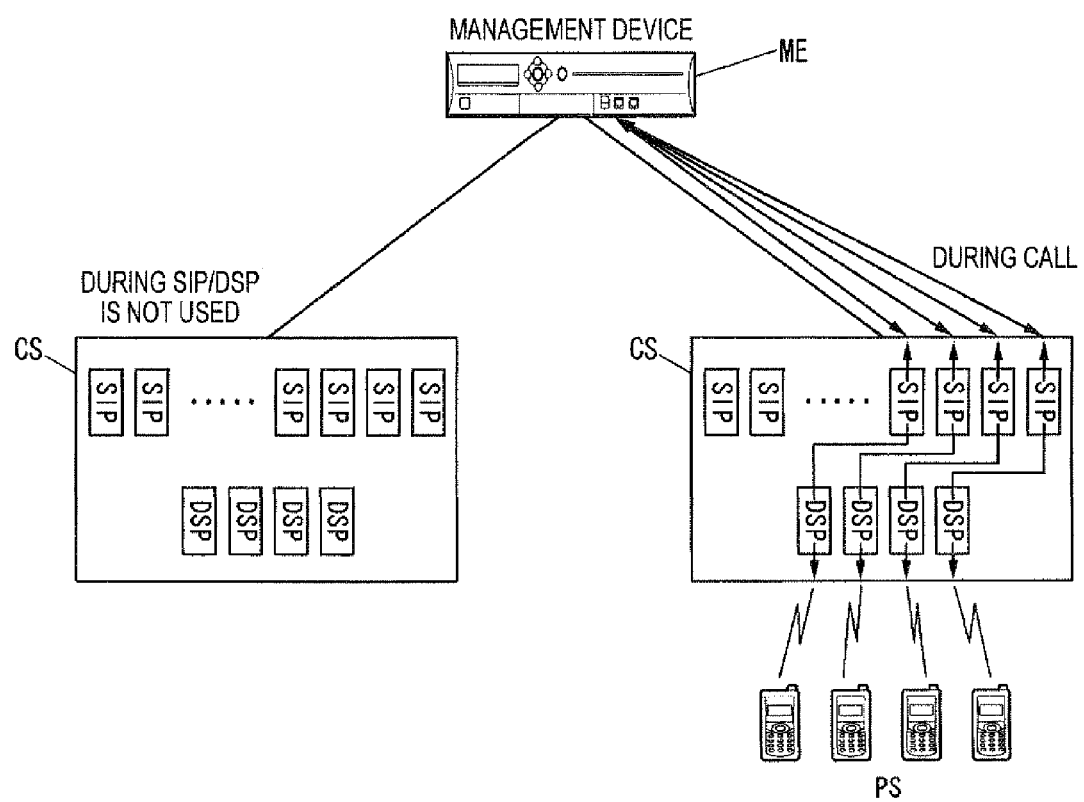
FIG. 6 is an illustrative diagram of a resource of the radio base station device according to the first embodiment of the present invention.
Figure 7:
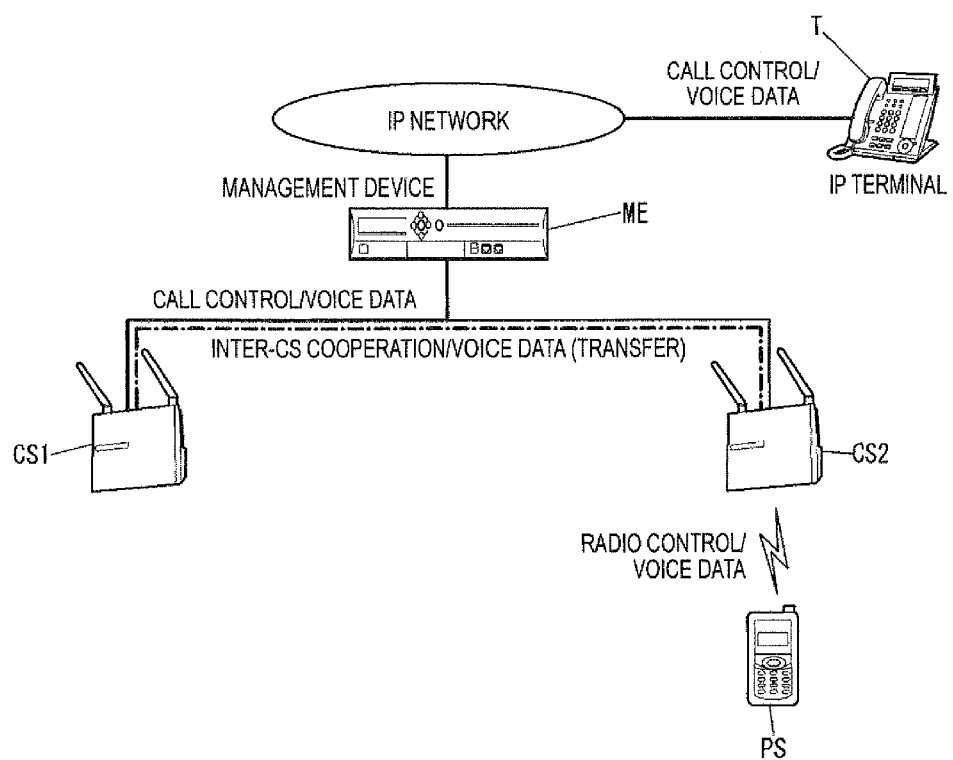
FIG. 7 is an illustrative diagram of the network in which the radio base station device is arranged after handover is conducted according to the first embodiment of the present invention.
Figure 8:
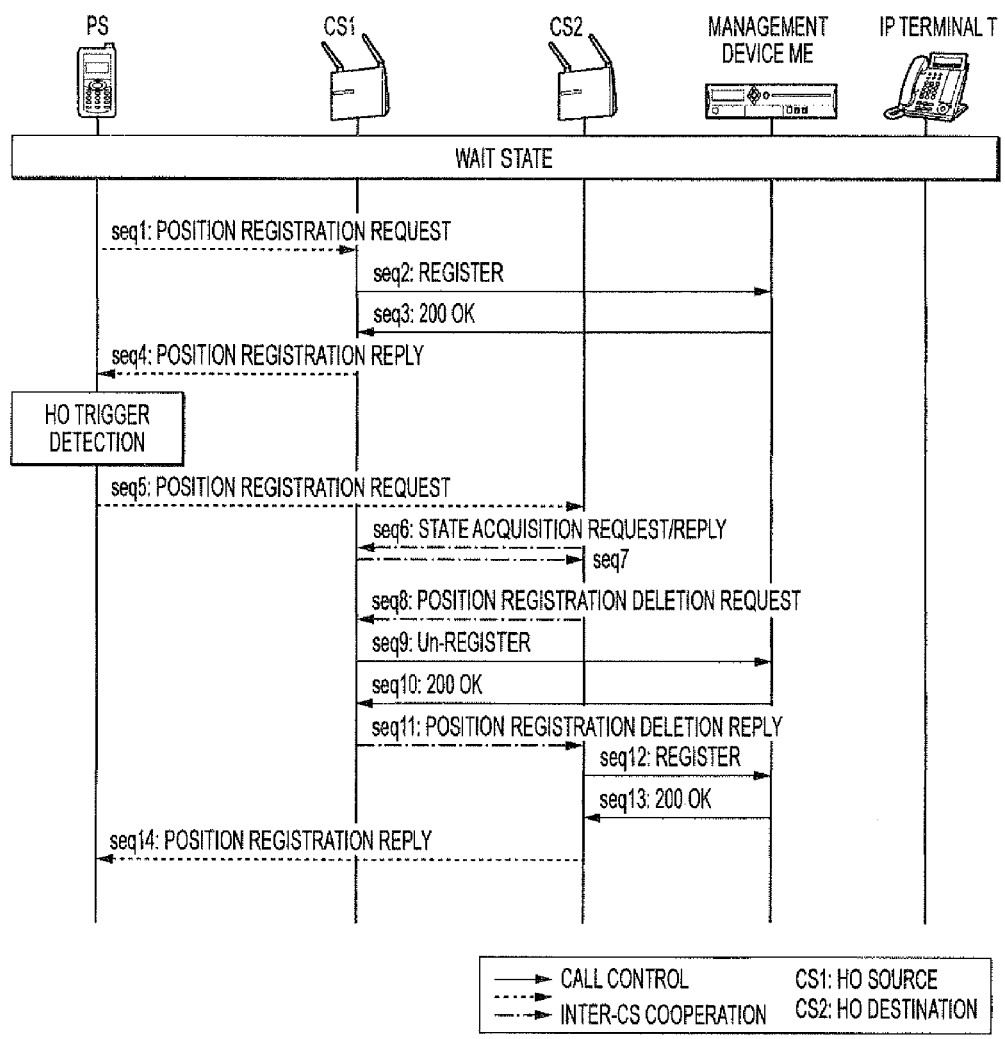
FIG. 8 is an illustrative diagram of a position registration sequence that is conducted in an SIP by the radio base station device according to the first embodiment of the present invention.
Figure 9:
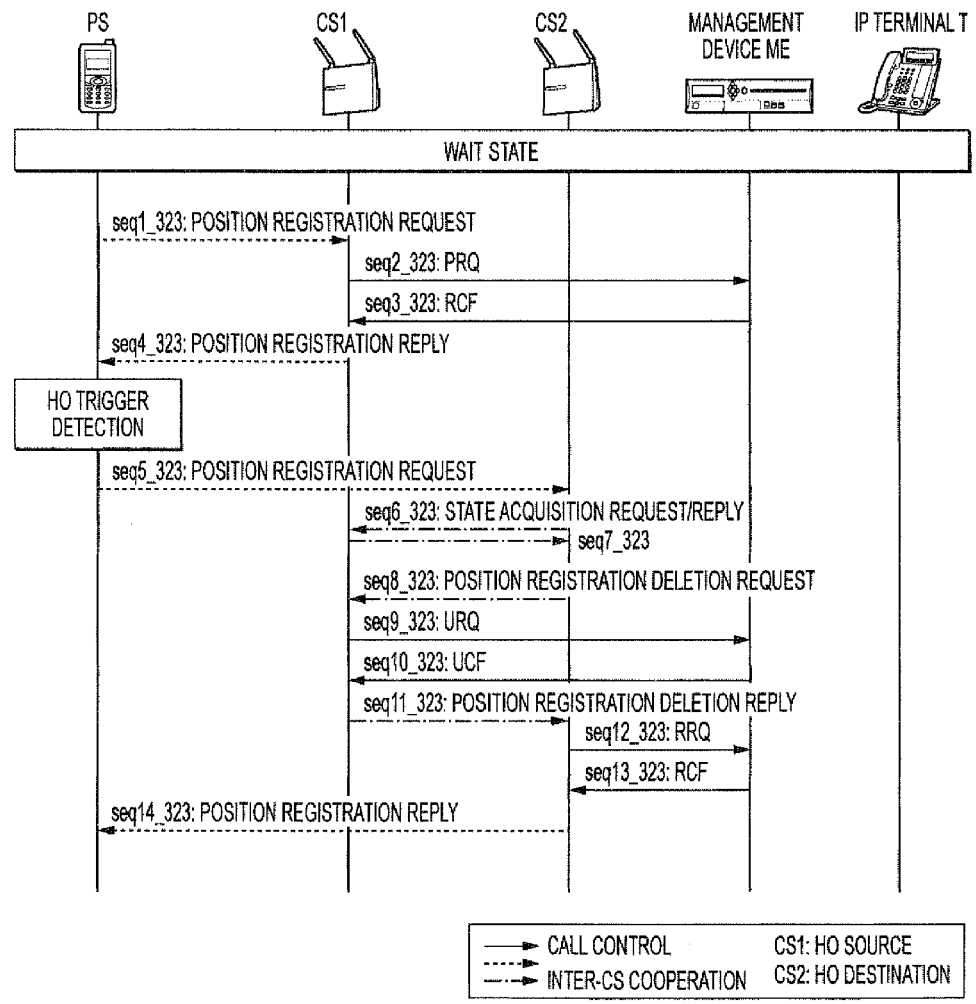
FIG. 9 is an illustrative diagram of a position registration sequence that is conducted in H.323 by the radio base station device according to the first embodiment of the present invention.
Figure 10:
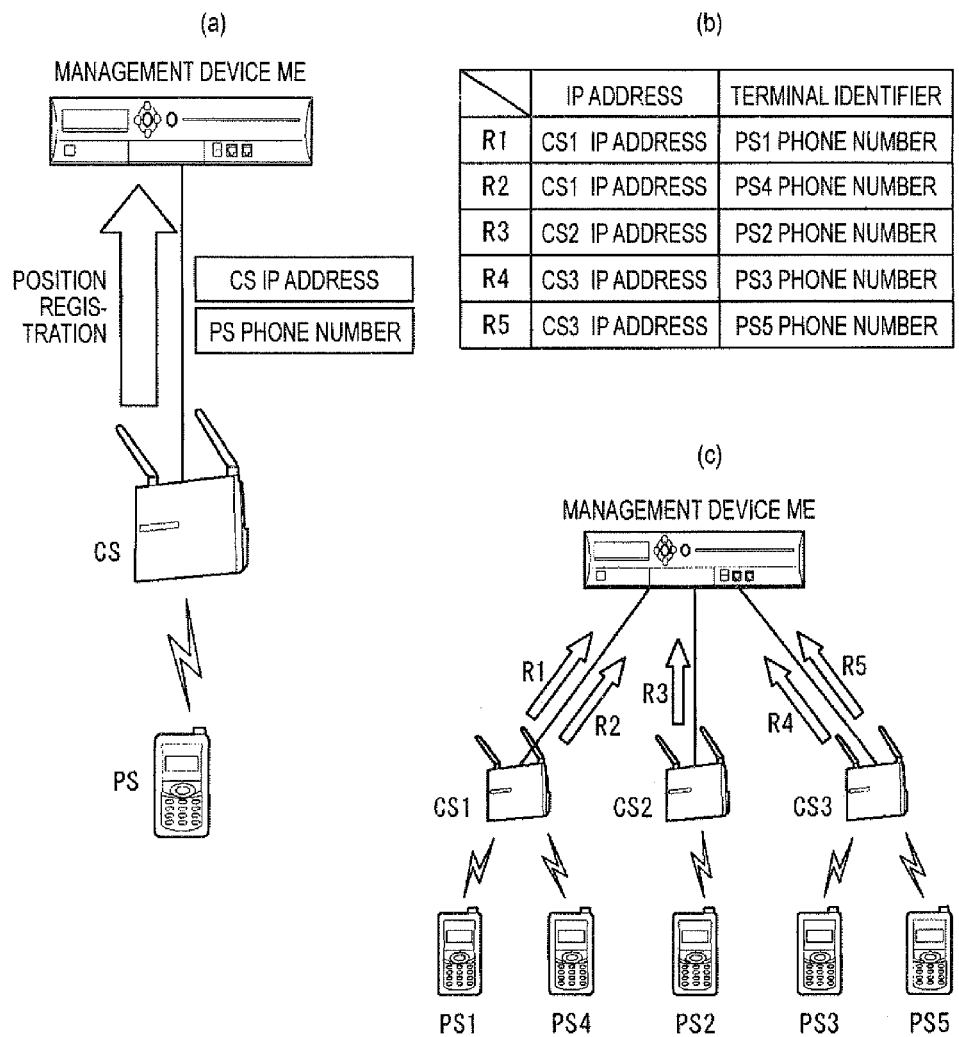
FIG. 10 is an illustrative diagram of the position registration according to the first embodiment of the present invention.

FIG. 1 is a schematic diagram of a radio base station device according to a first embodiment of the present invention. FIG. 2 is a configuration diagram of a network in which the radio base station device is arranged according to the first embodiment of the present invention. FIG. 3 is a configuration diagram of the radio base station device according to the first embodiment of the present invention. FIG. 4 is an illustrative diagram of the network in which the radio base station device is arranged before handover is conducted according to the first embodiment of the present invention. FIG. 5 is an illustrative diagram of the network in which the radio base station device is arranged during handover according to the first embodiment of the present invention. FIG. 6 is an illustrative diagram of a resource of the radio base station device according to the first embodiment of the present invention. FIG. 7 is an illustrative diagram of the network in which the radio base station device is arranged after handover is conducted according to the first embodiment of the present invention. FIG. 8 is an illustrative diagram of a position registration sequence that is conducted in an SIP by the radio base station device according to the first embodiment of the present invention. FIG. 9 is an illustrative diagram of a position registration sequence that is conducted in H.323 by the radio base station device according to the first embodiment of the present invention. FIG. 10 is an illustrative diagram of the position registration according to the first embodiment of the present invention.

Referring to FIG. 1, a radio cell station CS is representative of an example of the radio base station device according to the present invention. A radio personal station PS is representative of an example of a radio terminal, for example, a PHS terminal, a DECT terminal, a cellular phone, and a radio LAN terminal. The radio cell station CS and the radio personal station PS conduct communication through a plurality of channels multiplexed by a digital radio communication system, for example, a time division multiple access (TDMA) or a code division multiple access (CDMA). The radio cell station CS has a cell station function that manages communication processing of the radio personal station PS that is a personal station. In the following description of the embodiments, the radio base station according to the present invention is called "the radio cell station CS", and the radio terminal is called "the radio personal station PS".

A plurality of the radio cell stations CS are connected to a management device ME as illustrated in FIG. 2, and each of the radio cell stations CS forms a cell which is an example of a wireless universe. The management device ME is also called "main device", and connected to an IP network. The management device ME is equipped with a registration server of a management server such as an SIP server or an H.323 gate keeper. A call between the radio personal station PS and an IP terminal T is conducted by providing a session between the terminals through the IP network in conformity to the SIP or the H.323 for conducting communication.

The plurality of radio cell stations CS are connected to the management device ME as illustrated in FIG. 2, and each of the radio cell stations CS forms a cell (a wireless universe of the present invention). The management device ME is connected to the IP network. The management device ME is equipped with the registration server of the management server such as the SIP server or the H.323 gate keeper. The call between the radio personal station PS and the IP terminal T is conducted by providing the session between the terminals through the IP network in conformity to the SIP or the H.323 for conducting communication. Accordingly, a call connection according to the first embodiment is conducted in conformity to a digital radio communication and the SIP or H.323, and a call (voice call) that communicates is by voice. A call formed by the call connection is not limited to the voice call, but may be a data call. The data call treats various data such as images or texts.

Incidentally, as illustrated in FIG. 3, the radio cell station CS includes an antenna 11 that transmits and receives a radio signal, and a radio control unit 12 having a transmitter that transmits the radio signal and a receiver that receives the radio signal. Also, the radio cell station CS an RSSI (received signal strength indicator) 18 that measures a reception level of a received signal strength, a determination unit 17a that determines a radio line environment of a control channel on the basis of the signal strength in a certain period, and a base station control unit 17 that selects a channel on the basis of the determination of the determination unit 17a to control establishment or release of the channel, In the first embodiment, the determination unit 17a is configured as a function realizing unit that operates upon loading a program for determination in a hardware (CPU) configuring the base station control unit 17. A block diagram illustrated in FIG. 3 can be configured by a plurality of circuits using ICs (integrated circuits). For example, the block diagrams may be configured by a CPU, a memory (RAM (random access memory)), and an ASIC (application specific integrated circuit).

A call control unit 15 (an example of a call connection control section) of the radio cell station CS transmits a message such as an INVITE (call connection notice) or a BYE (call disconnection notice) from the radio control unit 12 with the use of the channel selected by the base station control unit 17 in conformity to the SIP. The RSSI 18 measures the reception level of a radio signal received through a receiving unit of the radio control unit 12. The determination unit 17a determines that the electric wave environment is deteriorated if the reception level is a threshold level or lower, and determines that the channel should be switched to a fresh channel.

The call control unit 15 according to the first embodiment conforms to the SIP as illustrated in FIGS. 3 and 6, Therefore, the call control unit 15 has a plurality (n SIPs including SIP1 to SIPn) of, for example, 264 call information management units 15a, which each function as an SIP user agent", mounted therein, and conduct call control. The same configuration is also applied to a case of H.232. Also, a voice codec unit 13 of FIG. 3 includes a plurality of DSPs (digital signal processors) which is each configured by an IC codec. The voice codec unit 13 conducts the call control and transmits or receives voice data in a digital radio communication system. In order that the radio cell station CS of FIG. 3 conduct communication by four channels, DSP1 to DSP4 are mounted therein. Accordingly, in FIG. 6, one radio cell station CS can communicate with the radio personal stations PS at a maximum at the same time, and conducts communication by using one DSP and one SIP for each channel.

In order that the radio personal station PS transmits and receives a call with respect to the IP terminal T through the radio cell station CS, the call information management units 15a need to recognize the position of the radio personal station PS. For that reason, the radio personal station PS searches the radio cell station CS, and issues a connection request to the searched radio cell station CS. Then, the radio personal station PS transmits, to the registration server of the management device ME, a CS_IP address and a terminal identifier (PS phone number) according to the REGISTER (position registration request) as illustrated in FIGS. 10(a), 10(b), and 10(c). Then, the radio personal station PS registers the position for each channel in a registration table. The identification information (in this example, the terminal identifier (phone number, hereinafter referred to as "PS phone number")) of the radio personal station PS is associated with the identification information (IP address, hereinafter referred to as "CS_IP address") of the radio cell station CS. For example, in order to communicate with the radio personal station PS1 in a channel R1 of FIGS. 10(b) and 10(c), the radio cell station CS1 positionally registers the CS1_IP address and the PS1 phone number in association with the management device ME. In order to communicate with the radio personal station PS4 with the use of a channel R2, the radio cell station CS1 positionally registers the CS1_IP address and the PS4 phone address in the management device ME.

Incidentally, in the first embodiment of the present invention, a network control unit 14 (an example of a position registration request section) shares information with the radio cell station CS so as to be associated with the radio cell station CS, and conducts the position registration only when ending the call, without conducting the position registration every time handover occurs during the call. The position registration has been already conducted when starting the call.

For that reason, a transfer destination management unit 14a manages the radio cell station CS so that a transfer path is established to enable transfer, during travel of the radio personal station PS, and allows the cooperation/voice data shared by an RTP information management unit 14b to be transferred. Various set information is stored in a memory 16. In addition, a jitter buffer is also disposed in the radio cell station CS (not shown).

The radio cell station CS can provide a plurality of call connection services such as a conference call or hold when a second call occurs during the call. For that reason, in the first embodiment, the call control unit 15 controls a plurality of call connections generated by the respective radio personal stations PS at the same time for at least a given time. The call control unit 15 does not request the position registration of the management device ME while at least one call connection is conducted, but requests the position request of the management device ME when all of the plural call connections have been completed.

The identification information on the radio terminal means information that enables the radio terminal to be uniquely identified from other radio terminals, and is not limited to the phone number. For example, the identification information on the radio terminal may be a local IP address. Also, the identification information on the radio base station device means information that enables the radio terminal to be uniquely identified from other radio terminals, and the IP address that is an example of the identification information is not limited to the global IP address, but may be a local IP address.

When the radio personal station PS travels from the cell of the radio cell station CS1 to the cell of the radio cell station CS2 in FIG. 2 during the call, handover is conducted for switching from the cell of the radio cell station CS1 to the cell of the radio cell station CS2. Also, a position at which the radio personal station PS exists is registered in the registration server of the management device ME when handover is conducted not during the call. Hereinafter, each procedure will be described with respect to each status.

(Procedure of Position Registration: SIP)

A procedure of conducting the position registration will be described. First, a procedure of the position registration by the SIP will be described. The registration information on the SIP server is discarded after a time included in a position registration reply (hereinafter referred to as "2000K") has been elapsed, and therefore the radio cell station CS issues the position registration request before the registration information is discarded in each case. Accordingly, the position registration request is executed every time the radio personal station PS travels from one cell to another cell in a wait state (non-call state), or periodically. Also, the position registration is executed when the radio personal station PS newly accesses to the radio cell station CS. On the contrary, in the present invention, in the call state, the position registration is conducted only when ending the call. However, the position registration periodically conducted is executed according to a normal procedure on the basis of the information on the radio cell station CS of the handover source.

Referring to FIG. 8, when the position registration request is issued from the radio personal station PS to the radio cell station CS1 (seq 1), the radio cell station CS transmits the REGISTER (position registration request) to the registration server of the management device ME (seq 2). On the contrary, the SIP server transmits "200OK" (seq 3), and the radio cell station CS1 that has received "200OK" transmits the position registration reply to the radio personal station PS (seq 4).

Also, apart from the discard time elapse, the radio personal station PS waits for the RSSI 18 to detect a handover trigger (hereinafter referred to also as "HO trigger"). The RSSI 18 detects the handover trigger, and the determination unit 17a determines that handover is necessary. In this case, the radio personal station PS issues the position registration request to the radio cell station CS2 of the handover destination (seq 5). As a result, the radio cell station CS2 transmits a state acquisition request to the radio cell station CS1 (seq 6), and the radio cell station CS1 returns a state acquisition reply to the radio cell station CS2 (seq 7). In the state acquisition reply, state information indicative of a call connection state (for example, idle) of the radio personal station PS is transmitted. The radio cell station CS2 that has confirmed that there is no call connection of the call state issues a position registration deletion request to the radio cell station CS1 (seq 8).

On the contrary, the radio cell station CS1 transmits "Un-Register (position registration deletion request) to the registration server (seq 9). The registration server transmits "200OK" to the radio cell station CS1 (seq 10) with the result that the radio cell station CS1 transmits the position registration deletion reply to the radio cell station CS2 (seq 11). Seqs 6, 7, 8, and 11 are executed according to a procedure unique to the present invention.

In order to newly conduct the position registration, the radio cell station CS2 that has received the position registration deletion reply transmits the REGISTER (position registration request) to the registration server (seq 12), and the registration server transmits "200OK" (seq 13). Under the circumstances, the radio cell station CS2 transmits the position registration reply to the radio personal station PS (seq 14), and a series of procedures for the position registration in the SIP are completed.

(Procedure of Position Registration: H.323)

A procedure of the position registration by H.323 will be described. Referring to FIG. 9, when the position registration request is issued from the radio personal station PS to the radio cell station CS1 (seq 1_323), the radio cell station CS1 transmits an RRQ (position registration request) to an H.323 gate keeper of the management device ME (seq2_323). In the RRQ (position registration request), control information such as the CS_IP address or the terminal identifier (PS phone number) is transmitted. On the contrary, the H.323 gate keeper transmits an RCF (registration completion notice) (seq 3_323), and the radio cell station CS1 that has received the RCF transmits the position registration reply to the radio personal station PS (seq 4_323).

Also, apart from the discard time elapse, the radio personal station PS waits for the RSSI 18 to detect the handover trigger. The RSSI 18 detects the handover trigger, and the determination unit 17a determines that handover is necessary. In this case, the radio personal station PS issues the position registration request to the radio cell station CS2 of the handover destination (seq 5_323). As a result, the radio cell station CS2 transmits a state acquisition request to the radio cell station CS1 (seq 6_323), and the radio cell station CS1 returns a state acquisition reply to the radio cell station CS2 (seq 7_323). In the state acquisition reply, state information indicative of a call connection state (for example, idle) of the current PS is transmitted. The radio cell station CS2 that has confirmed that there is no call connection of the call state issues a position registration deletion request to the radio cell station CS1 (seq 8_323).

On the contrary, the radio cell station CS1 transmits a URQ (position registration deletion request) to the H.323 gate keeper (seq 9_323). The H.323 gate keeper transmits a UCF (position registration deletion reply) to the radio cell station CS1 (seq 10_323) with the result that the radio cell station CS1 transmits the position registration deletion reply to the radio cell station CS2 (seq 11_323).

In order to newly conduct the position registration, the radio cell station CS2 that has received the position registration deletion reply transmits the RRQ (position registration request) to the H.323 gate keeper (seq 12_323), and the H.323 gate keeper transmits the RCF (registration completion notice) (seq 13_323). Under the circumstances, the radio cell station CS2 transmits the position registration reply to the radio personal station PS (seq 14_323), and a series of procedures for the position registration in the H.323 are completed. Seqs 6_323, 7_323, 8_323, and 11_323 are executed according to a protocol specified uniquely to the first embodiment.

(Procedure of Handover: SIP)

Figure 15:
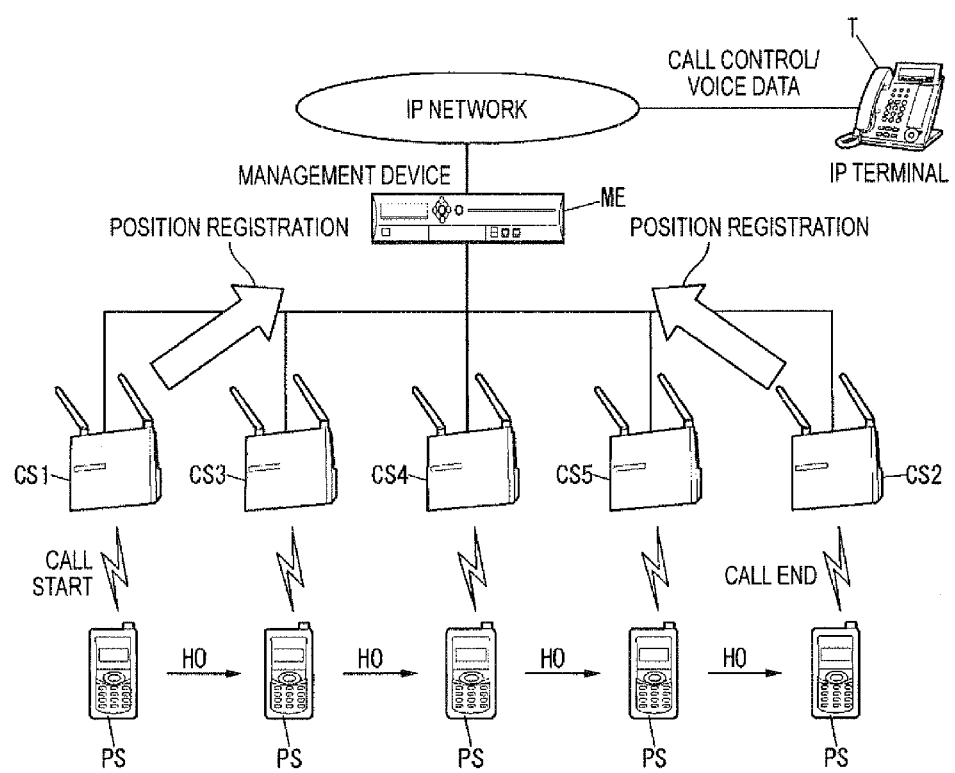
FIG. 15 is an illustrative diagram illustrating an appearance of the position registration when handover is continuously conducted between the radio base station devices according to the first embodiment of the present invention.

Subsequently, a procedure of conducting the handover according to the first embodiment of the present invention will be described. In the present invention, the radio cell stations CS1, CS2, . . . , and CSn operate in cooperation with each other. While the cooperation/voice data is transferred, even if the radio cell station CS that is wirelessly connected with the radio personal station PS is changed, the position registration of the radio personal station PS is not conducted, but conducted only when ending the call. An appearance in which the cooperation/voice data is transferred in the radio cell stations CS1 and CS2 cooperated with CS is illustrated in FIGS. 5 and 7. Also, an appearance of the position registration when the radio personal station PS continuously conducts the handover between the respective radio cell stations CS1, CS2, . . . and CSn is illustrated in FIG. 15. FIG. 15 is an illustrative diagram illustrating an appearance of the position registration when handover is continuously conducted between the radio cell station CSs according to the first embodiment of the present invention.

Figure 11:
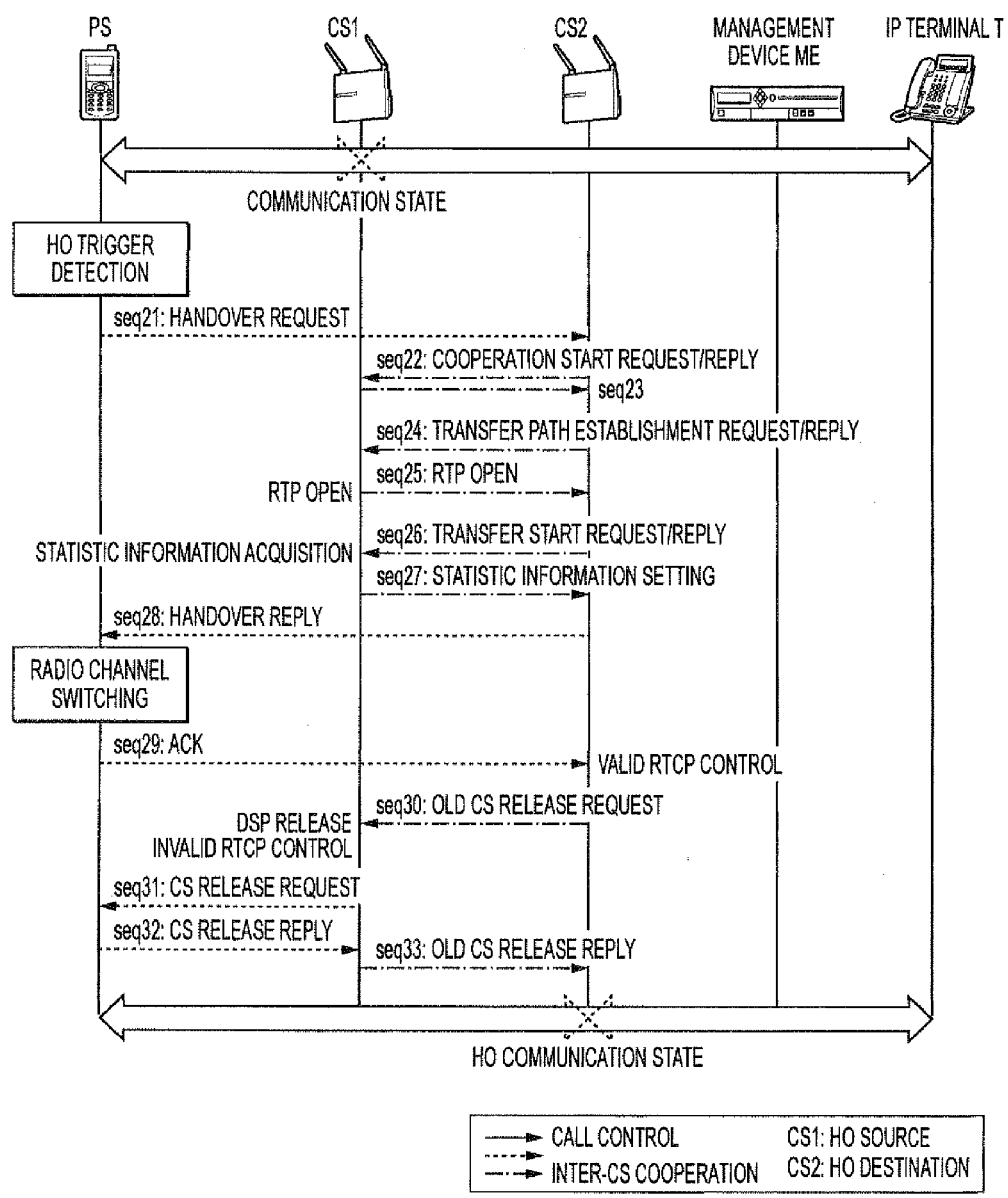
FIG. 11 is an illustrative diagram of a sequence of handover that is conducted in the SIP during a call by the radio base station device according to the first embodiment of the present invention.
Figure 12:
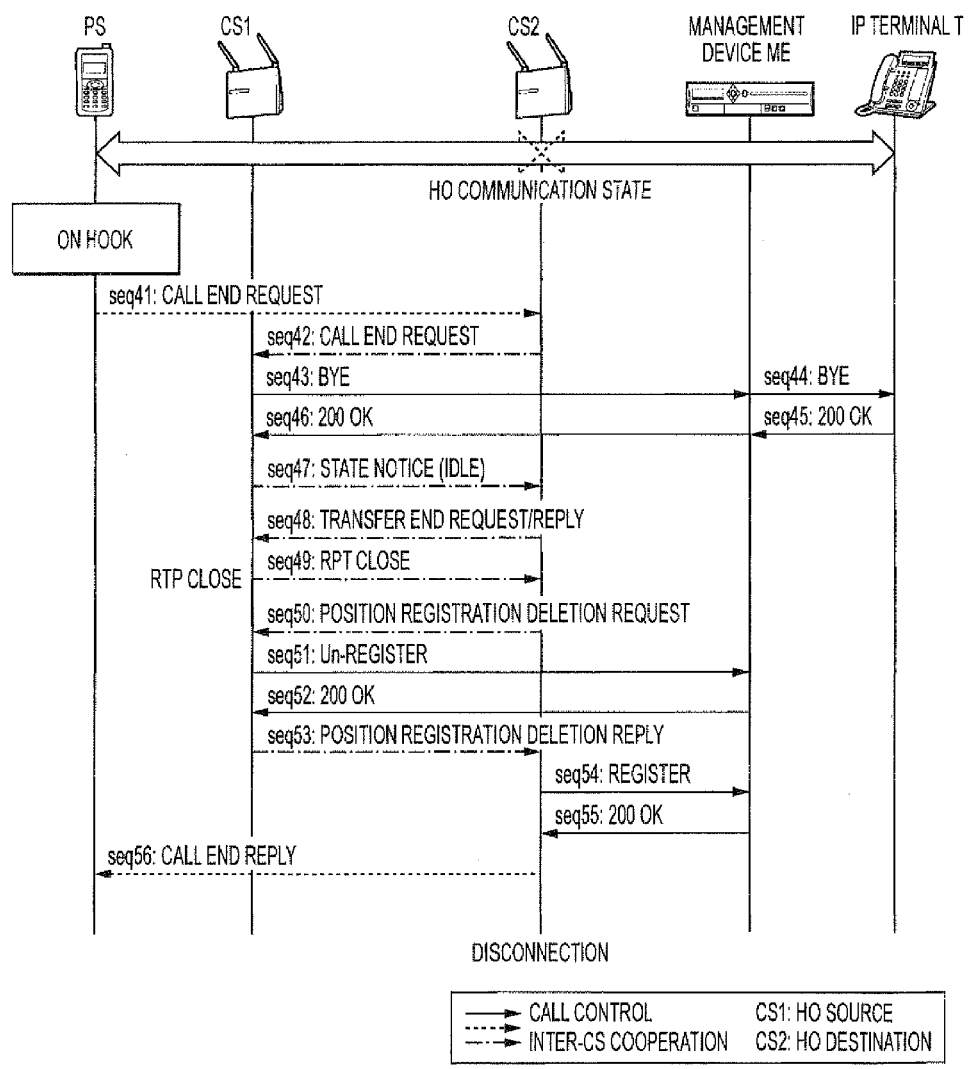
FIG. 12 is an illustrative diagram of a sequence of a call end that is conducted in the SIP during a call in cooperation with the radio base station device according to the first embodiment of the present invention.
Figure 13:
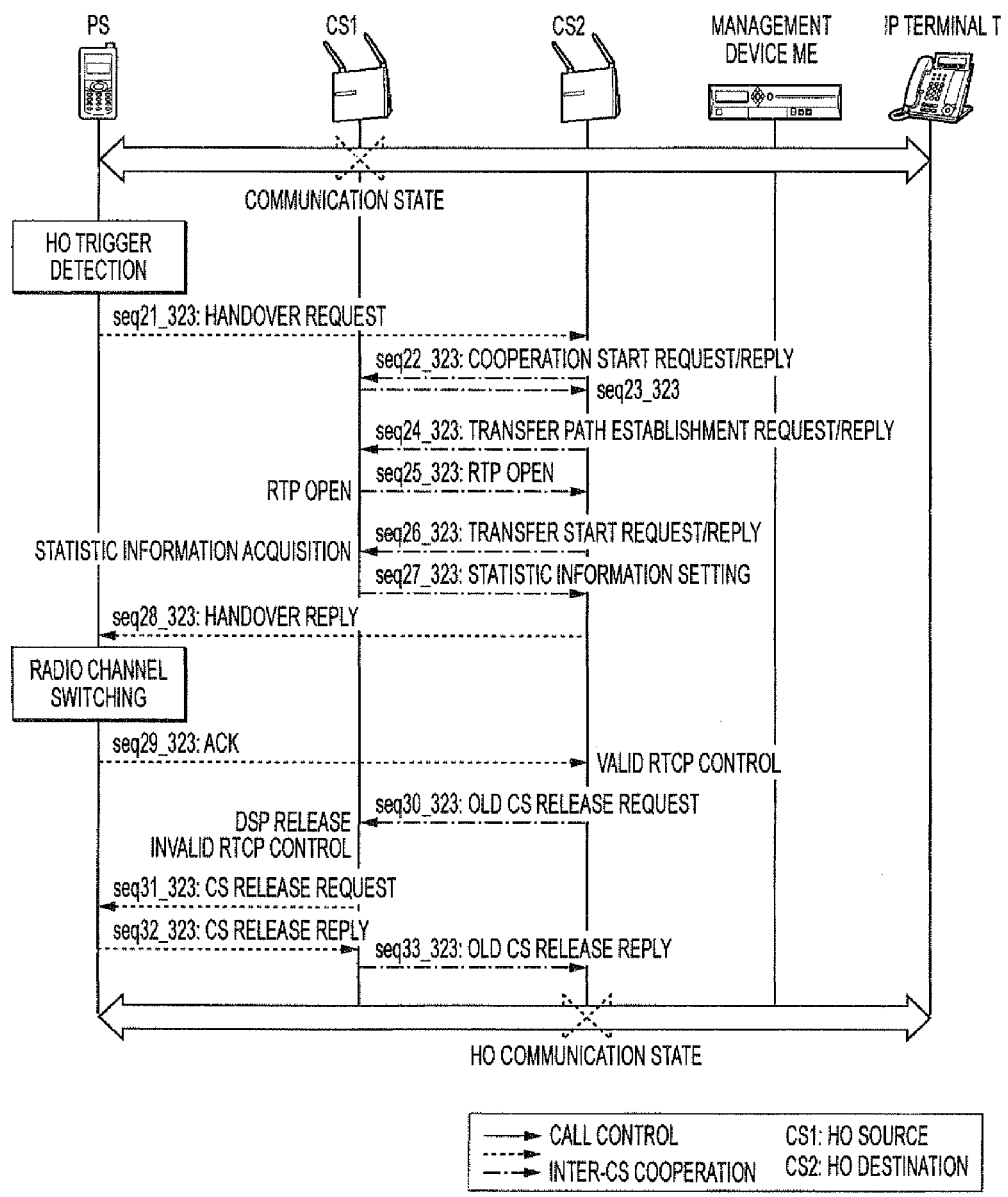
FIG. 13 is an illustrative diagram of a sequence of handover that is conducted in the H.323 during a call by the radio base station device according to the first embodiment of the present invention.
Figure 14:
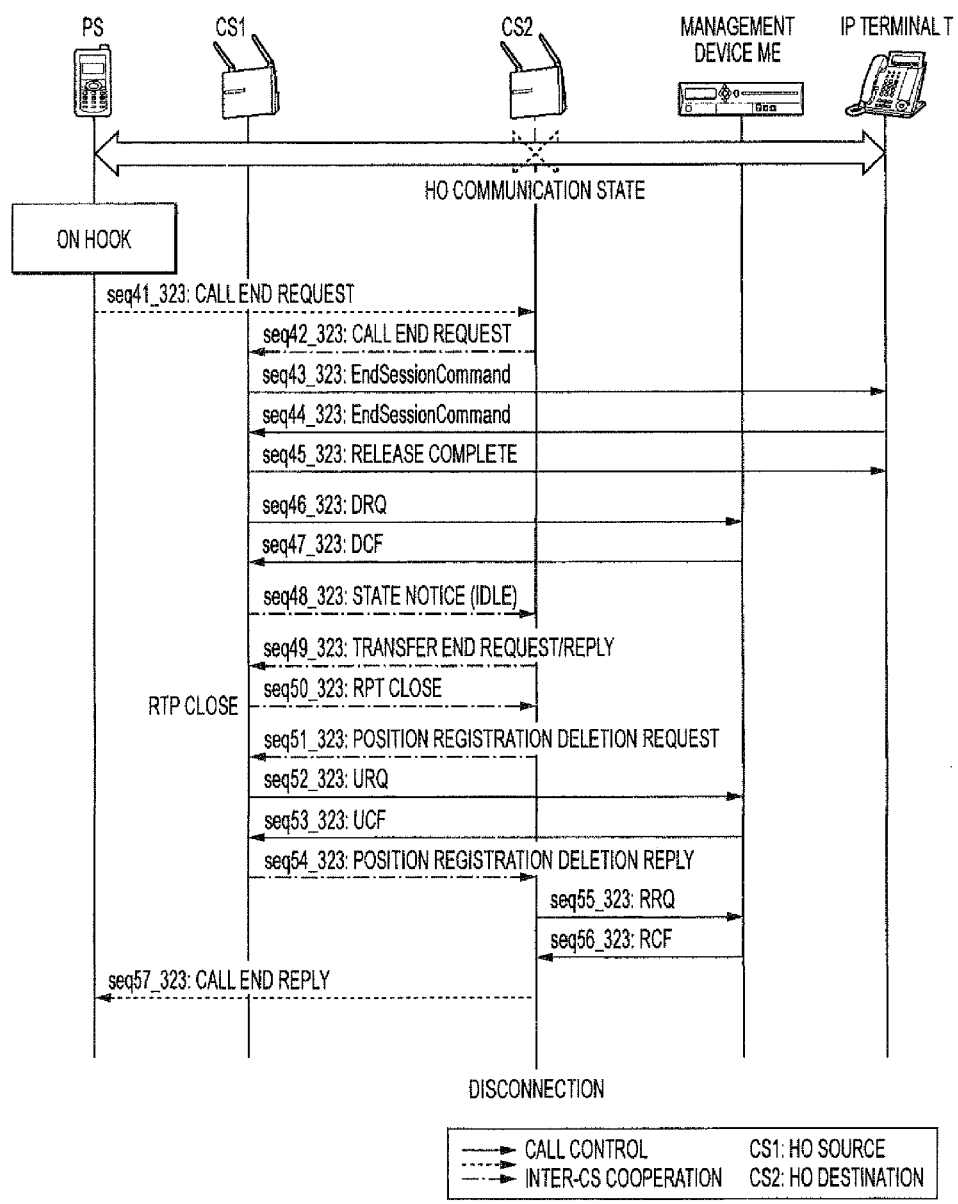
FIG. 14 is an illustrative diagram of a sequence of a call end that is conducted in the H.323 during a call in cooperation with the radio base station device according to the first embodiment of the present invention.

FIG. 11 is an illustrative diagram of a sequence of handover that is conducted in the SIP during a call by the radio cell station CS according to the first embodiment of the present invention. FIG. 12 is an illustrative diagram of a sequence of a call end that is conducted in the SIP during a call in cooperation with the radio cell station CS according to the first embodiment of the present invention. FIG. 13 is an illustrative diagram of a sequence of handover that is conducted in the H.323 during a call by the radio cell station according to the first embodiment of the present invention. FIG. 14 is an illustrative diagram of a sequence of a call end that is conducted in the H.323 during a call in cooperation with the radio cell station according to the first embodiment of the present invention.

First, the handover conducted while the radio cell station CS1 is calling the IP terminal T will be described. As illustrated in FIG. 4, the radio personal station PS and the radio cell station CS1 are wirelessly connected to each other, and the radio cell station CS1 is connected to the IP terminal T of a communication partner. The radio control/voice data is communicated between the radio cell station CS1 and the radio personal station PS in the digital radio communication system, and also communicated between the radio cell station CS1 and the IP terminal T in conformity to the SIP.

In this state, when the RSSI of the radio personal station PS detects the handover trigger at a certain time as illustrated in FIG. 11, the radio personal station PS issues a handover request to the radio cell station CS2 (seq 21). On the contrary, the radio cell station CS2 transmits a cooperation start request to the radio cell station CS1 (seq 22), and the radio cell station CS1 transmits a cooperation start reply to the radio cell station CS2 (seq 23). When the radio cell station CS2 receives the cooperation start reply, a call connection of the radio personal station PS is relayed to the management device ME by the radio cell station CS1 and the radio cell station CS2.

Then, the radio cell station CS2 transmits a transfer path establishment request to the radio cell station CS1 (seq 24), and the radio cell station CS1 transmits a transfer path establishment reply to the radio cell station CS2 (seq 25). As a result, the radio cell station CS1 and the radio cell station CS2 opens an RTP transfer path. Further, the radio cell station CS2 transmits a transfer start request to the radio cell station CS1 (seq 26), and the radio cell station CS1 transmits a transfer start reply to the radio cell station CS2 (seq 27). When the radio cell station CS2 receives the transfer start reply, the transfer of the voice data is started. The radio cell station CS2 acquires statistical information such as the number of RTP transmission packets or the number of RTP loss packets of the radio cell station CS1, and the radio cell station CS2 sets the statistical information in the memory 16. Thereafter, the radio cell station CS2 transmits a handover reply to the radio personal station PS (seq 28).

The radio personal station PS switches the radio channel to another one for connection with the radio cell station CS2, and transmits an ACK to the radio cell station CS2 (seq 29). As a result, an RTCP control of the radio cell station CS2 becomes valid, and the voice data is transferred through the transfer path by an RTP, Then, the radio cell station CS2 transmits an old CS release request to the radio cell station CS1 (seq 30). The radio cell station CS1 releases the DSP, and the RTCP control of the radio cell station CS1 becomes invalid. Further, the radio cell station CS1 transmits a CS release request to the radio personal station PS (seq 31), and the radio personal station PS transmits a CS release reply (seq 32). The radio cell station CS1 that has received the CS release reply transmits an old CS release reply (seq 33), the radio cell station CS1 and the radio cell station CS2 are cooperated with each other, and the handover is conducted from the radio cell station CS1 to the radio cell station CS2 during a call.

Upon completion of the handover, the radio personal station PS is wirelessly connected to the radio cell station CS2, and radio control/voice data are transmitted and received between the radio personal station PS and the radio cell station CS2. The radio cell station CS2 transfers CS cooperation/voice data to the radio cell station CS1 in cooperation with the CSs, and the radio cell station CS1 conducts a call control by the SIP on the basis of the CS cooperation data received by a UDP from the radio cell station CS2 in cooperation with the CS, and transfers the voice data to the IP terminal T by the RTP. Also, the call control/voice data received by the radio cell station CS1 from the IP terminal T in the SIP and the RTP is transferred to the radio cell station CS2 as the CS cooperation/voice data in the UDP/RTP. Seqs 22, 23, 24, 25, 26, 27, 30 and 33 are executed according to a procedure unique to the present invention.

(Call End Procedure from Handover Call State SIP)

Subsequently, a description will be given of a call end procedure when the radio personal station PS becomes on-hook in the handover call state (hereinafter referred to also as "HO call state"). Referring to FIG. 12, when the radio personal station PS becomes on-hook, the radio personal station PS transmits a call end request to the radio cell station CS2 wirelessly connected (seq 41). Then, the radio cell station CS2 transfers the call end request as an inter-CS cooperation procedure to the radio cell station CS1 a current position of which has been registered during cooperation with the CSs (seq 42). The radio cell station CS1 transmits a BYE (call disconnection notice) to the management device ME connected to the IP network (seq 43), and the management device ME transfers the BYE (call disconnection notice) to the IP terminal T (seq 44). On the contrary, the IP terminal T transmits "200OK" (seq 45), and the management device ME transfers "200OK" to the radio cell station CS1 (seq 46).

The radio cell station CS1 that has received "200OK" notifies the cooperating radio cell station CS2 of a state notice (idle) (seq 47). The radio cell station CS2 transmits a transfer end request to the radio cell station CS1 (seq 48), and the radio cell station CS1 transmits a transfer end reply (seq 49). In this procedure, the radio cell station CS2 ends the cooperation with the radio cell station CS1, ends the transfer of the voice data by the RTP, and closes the transfer path. That is, the call connection is completed.

Then, the radio cell station CS2 that has confirmed that there is no call connection of the call state issues a position registration deletion request to the radio cell station CS1 (seq 50). On the contrary, the radio cell station CS1 transmits "Un-Register (position registration deletion request)" to the registration server of the management device ME (seq 51). The registration server transmits "200OK" to the radio cell station CS1 (seq 52) with the result that the radio cell station CS1 transmits a position registration deletion reply to the radio cell station CS2 (seq 53).

The radio cell station CS2 that has received the position registration deletion reply transmits the REGISTER (position registration request) to the SIP server for the purpose of conducting a final position registration (seq 54), and the SIP server transmits "200OK" (seq 55). As a result, the position registration is conducted when ending the call. Accordingly, because the position registration sequence is not conducted in the cell during travel, seamless handover can be realized while reducing the number of position registrations, without making the management device ME and the partner terminal aware of handover. Therefore, the radio cell station CS2 transmits a call end reply to the radio personal station PS (seq 56), and the session is disconnected to end the call. Seqs 42, 47, 48, 49, 50, and 53 are executed according to a procedure unique to the present invention.

(Procedure of Handover H.323)

Subsequently, a description will be given of the handover conducted between the radio cell station CS1 and the IP terminal T when the above procedure is H.323.

In this state, when the RSSI of the radio personal station PS detects the handover trigger at a certain time as illustrated in FIG. 13, the radio personal station PS issues a handover request to the radio cell station CS2 (seq 21_323). On the contrary, the radio cell station CS2 transmits a cooperation start request to the radio cell station CS1 (seq 22_323), and the radio cell station CS1 transmits a cooperation start reply to the radio cell station CS2 (seq 23_323). When the radio cell station CS2 receives the cooperation start reply, a call connection of the radio personal station PS is relayed to the management device ME by the radio cell station CS1 and the radio cell station CS2.

Then, the radio cell station CS2 transmits a transfer path establishment request to the radio cell station CS1 (seq 24_323), and the radio cell station CS1 transmits a transfer path establishment reply to the radio cell station CS2 (seq 25_323). In response to the transfer path establishment request and the transfer path establishment reply, the radio cell station CS1 and the radio cell station CS2 opens an RTP transfer path. Further, the radio cell station CS2 transmits a transfer start request to the radio cell station CS1 (seq 26_323), and the radio cell station CS1 transmits a transfer start reply to the radio cell station CS2 (seq 27_323). The radio cell station CS2 acquires statistical information such as the number of RTP transmission packets or the number of RTP loss packets of the radio cell station CS1, and the radio cell station CS2 sets the statistical information in the memory 16. Thereafter, the radio cell station CS2 transmits a handover reply to the radio personal station PS (seq 28_323).

The radio personal station PS switches the radio channel to another one, and transmits an ACK to the radio cell station CS2 (seq 29_323). As a result, an RTCP control of the radio cell station CS2 becomes valid, and the voice data is transferred through the transfer path. Then, the radio cell station CS2 transmits an old CS release request to the radio cell station CS1 (seq 30_323). The radio cell station CS1 releases the DSP, and the RTCP control of the radio cell station CS1 becomes invalid.

Further, the radio cell station CS1 transmits a CS release request to the radio personal station PS (seq 31_323), and the radio personal station PS transmits a CS release reply (seq 32_323). The radio cell station CS1 that has received the CS release reply transmits an old CS release reply (seq 33_323), the radio cell station CS1 and the radio cell station CS2 are cooperated with each other, and the handover is conducted from the radio cell station CS1 to the radio cell station CS2 during a call. Segs 22_323, 23_323, 24_323, 25_323, 26_323, 27_323, 30_323 and 33_323 are executed according to a procedure unique to the present invention.

(Call End Procedure from Handover Call State: H.323)

Upon completion of the handover, like SIP, in H.323, the radio personal station PS is wirelessly connected to the radio cell station CS2, and radio control/voice data are transmitted and received between the radio personal station PS and the radio cell station CS2. The radio cell station CS2 transfers CS cooperation/voice data to the radio cell station CS1 in cooperation with the CSs, and the radio cell station CS1 transmits and receives call control/voice data with respect to the IP terminal T through the IP network in conformity to H.323.

Subsequently, a description will be given of a call end procedure when the radio personal station PS becomes on-hook in the handover call state (hereinafter referred to also as "HO call state"). Referring to FIG. 14, when the radio personal station PS becomes on-hook, the radio personal station PS transmits a call end request to the radio cell station CS2 wirelessly connected (seq 41_323). Then, the radio cell station CS2 transfers the call end request as an inter-CS cooperation procedure to the radio cell station CS1 a current position of which has been registered during cooperation with the CSs (seq 42_323). The radio cell station CS1 transfers "End Session Command" to the IP terminal T connected to the IP network (seq 43_323). On the contrary, the IP terminal T transmits "End Session command" to the radio cell station CS1 (seq 44_323). Further, the radio cell station CS1 transmits "RELEASE COMPLETE" to the IP terminal T (seq 45_323).

The radio cell station CS1 transmits a DRQ (cancel request) to the H.323 gate keeper of the cooperating management device ME (seq 46_323). The H.323 gate keeper transmits a DCF (cancel confirmation) (seq 47_323).

The radio cell station CS1 notifies the cooperating radio cell station CS2 of a state notice (idle) as an inter-CS cooperation procedure (seq 48_323). With this processing, the radio cell station CS2 transmits a transfer end request to the radio cell station CS1 for the purpose of ending the transfer of CS cooperation/voice data (seq 49_323), and the radio cell station CS2 transmits a transfer end reply (seq 50_323). In this procedure, the radio cell station CS1 ends the cooperation with the radio cell station CS2, ends the transfer of the voice data by the RIP, and closes the transfer path. That is, the call connection is completed.

Then, the radio cell station CS2 that has confirmed that there is no call connection of the call state issues a position registration deletion request to the radio cell station CS1 as an inter-CS cooperation procedure (seq 51_323). On the contrary, the radio cell station CS1 transmits an URQ (unregister request) to the H.323 gate keeper of the management device ME (seq 52_323). In response to this request, the H.323 gate keeper transmits an UCF (non-confirmation response) to the radio cell station CS1 (seq 53_323), and the radio cell station CS1 transmits a position registration deletion reply to the radio cell station CS2 (seq 54_323).

The radio cell station CS2 that has received the position registration deletion reply transmits an RRQ (position registration request) to the H.323 gate keeper for the purpose of conducting a final position registration (seq 55_323), and the H.323 gate keeper transmits an RCF (position registration reply) (seq 56_323). As a result, the position registration is conducted when ending the call. Accordingly, the position registration of the radio personal station PS is not conducted at a time point of the handover since the call starts until the call ends, and the position registration is conducted only when the call ends where the RRQ (position registration request) is transmitted. Therefore, the radio cell station CS2 transmits a call end reply to the radio personal station PS (seq 57_323), and the session is disconnected to end the call. Seqs 42_323, 48_323, 49_323, 50_323, 51_323, and 54_323 are executed according to a procedure unique to the present invention.

(Further Procedure of Handover in Handover Call State: SIP)

The above description is given of the handover control that is conducted in cooperation with the CS while the radio personal station PS travels between the radio cell stations CS1 and CS2. Further, a description will be given of the handover control when the radio personal station PS travels from the cell of the radio cell station CS2 to the cell of the radio cell station CS3.

Figure 16:
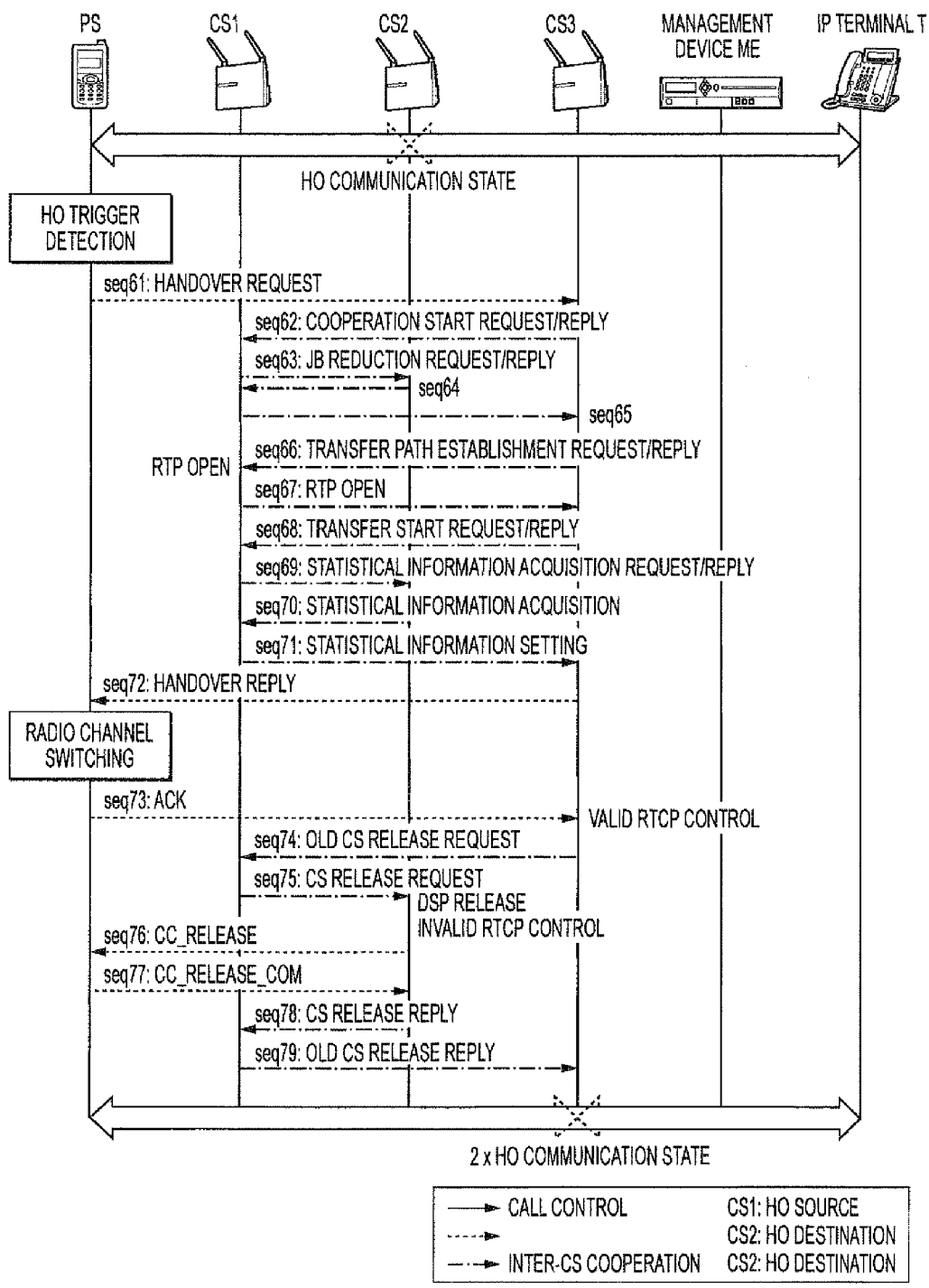
FIG. 16 is an illustrative diagram of a sequence of handover that is conducted in a handover call state by the radio base station device according to the first embodiment of the present invention.
Figure 17:
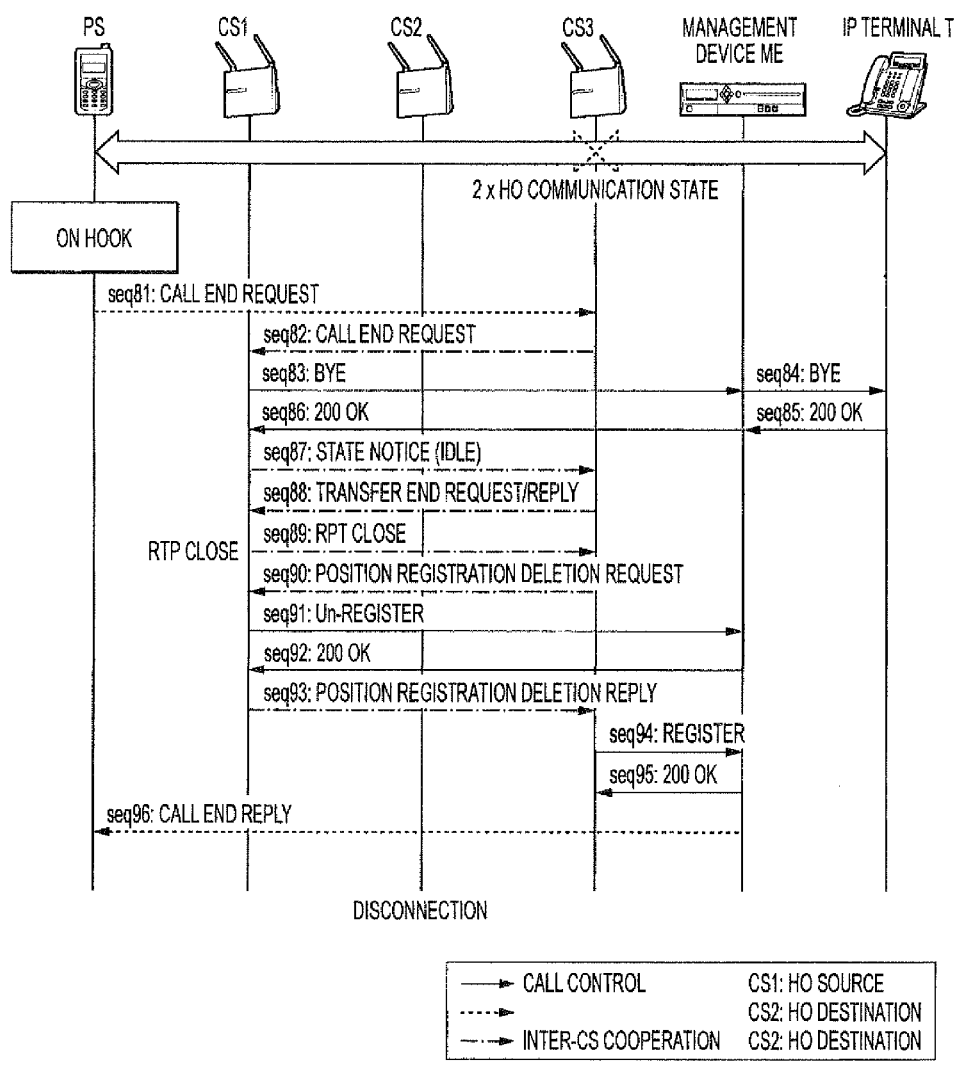
FIG. 17 is an illustrative diagram of a sequence of a call end that is conducted in the handover call state in cooperation with the radio base station device according to the first embodiment of the present invention.

FIG. 16 is an illustrative diagram of a sequence of handover that is conducted in a handover call state by the radio cell station according to the first embodiment of the present invention. FIG. 17 is an illustrative diagram of a sequence of a call end that is conducted in the handover call state in cooperation with the radio cell station according to the first embodiment of the present invention.

In an HO call state of FIG. 16, hangover from the radio cell station CS1 to the radio cell station CS2 is ended, the radio personal station PS is wirelessly connected to the radio cell station CS2 to transmit and receive the radio control/voice data therebetween. Also, the radio cell station CS2 transfers CS cooperation/voice data to the radio cell station CS1 in cooperation with the CSs, and the radio cell station CS1 conducts a call control in the SIP on the basis of the CS cooperation data received from the radio cell station CS2 by the UDP in cooperation with the CSs, and transfers the voice data to the IP terminal T in the RTP. Also, the call control/voice data received by the radio cell station CS1 from the IP terminal T in the SIP and the RIP is transferred to the radio cell station CS2 as the CS cooperation/voice data in the UDP/RTP, respectively.

In this state, when the RSSI of the radio personal station PS detects a handover trigger at a certain time as illustrated in FIG. 16, the radio personal station PS issues a handover request to the radio cell station CS3 (seq 61). On the contrary, the radio cell station CS3 transmits a cooperation start request to the radio cell station CS1 (seq 62). The radio cell station CS1 issues a cooperation provision request to the radio cell station CS2 (seq 63), and the radio cell station CS2 transmits a cooperation provision reply to the radio cell station CS1 (seq 64). Further, the radio cell station CS1 transmits a cooperation start reply to a cooperation start request to the radio cell station CS3 (seq 65). When the radio cell station CS3 receives the cooperation start reply, a call connection of the radio personal station PS is relayed to the management device ME by the radio cell station CS1 and the radio cell station CS3.

Then, the radio cell station CS3 transmits a transfer path establishment request to the radio cell station CS1 (seq 66), and the radio cell station CS1 transmits a transfer path establishment reply to the radio cell station CS3 (seq 67). In response to the transfer path establishment request and the transfer path establishment reply, the radio cell station CS1 and the radio cell station CS2 opens an RTP transfer path. When receiving the transfer path establishment reply, the radio cell station CS3 transmits a transfer start request to the radio cell station CS1 (seq 68), and the radio cell station CS1 that has received the request transmits a statistical information acquisition request to the radio personal station PS and the currently communicating radio cell station CS2 (seq 69). The radio cell station CS2 transmits a statistical information acquisition reply (seq 69). The radio cell station CS1 transfers the acquired statistical information to the radio cell station CS3 (seq 70). As a result, the radio cell station CS3 sets the statistical information such as the number of RTP transmission packets or the number of RTP loss packets (seq 71).

In this state, the radio cell station CS3 transmits a handover reply to the handover request (refer to seq 61) to the radio personal station PS in a radio communication (seq 72). As a result, the radio personal station PS switches the radio channel to another one, and transmits an ACK to the radio cell station CS3 (seq 73). The ACK is received, the RTCP control of the radio cell station CS3 becomes valid, and the voice data is transferred through the transfer path.

Then, the radio cell station CS3 transmits an old CS release request to the radio cell station CS1 (seq 74). The radio cell station CS1 issues a CS release request to the radio cell station CS2 (seq 75), and releases the DSP. As a result, the RTCP control of the radio cell station CS2 becomes invalid.

Thereafter, the radio cell station CS2 transmits CC_RELEASE (CS release request) to the radio personal station PS (seq 76), and the radio personal station PS transmits CC_RELEASE_COM (CS release reply) to the radio cell station CS2 (seq 77). The radio cell station CS2 that has received the CS release reply transmits a CS release reply to the radio cell station CS1 (seq 78), and the radio cell station CS1 transmits an old CS release reply to an old CS release request (refer to seq 74) to the radio cell station CS3 (seq 79). Seqs 62 to 71, 74, 75, 78, and 79 are executed according to a procedure unique to the present invention.

Through the series of procedure, the radio cell station CS1, the radio cell station CS2, and the radio cell station CS3 are cooperated with each other, the handover is conducted from the radio cell station CS1 to the radio cell station CS2 during a call, and the handover is conducted from the radio cell station CS2 to the radio cell station CS3, Upon completion of the handover, the radio personal station PS is wirelessly connected to the radio cell station CS3, and radio control/voice data are transmitted and received between the radio personal station PS and the radio cell station CS3. The radio cell station CS3 transfers CS cooperation/voice data to the radio cell station CS1 in cooperation with the CSs, and the radio cell station CS1 conducts a call control in the SIP on the basis of the CS cooperation data received from the radio cell station CS3 in the UDP in cooperation with the CSs, and transfers the voice data to the IP terminal T in the RTP. Also, the call control/voice data received by the radio cell station CS1 from the IP terminal T in the SIP and the RTP is transferred to the radio cell station CS3 as the CS cooperation/voice data in the UDP/RTP, respectively.

(Call End Procedure after Handover is conducted in Handover Call State: SIP)

Subsequently, a description will be given of a call end procedure when the radio personal station PS becomes on-hook in a further handover call state (hereinafter referred to also as "2×HO call state") in handover during the handover call. Referring to FIG. 17, when the radio personal station PS becomes on-hook, the radio personal station PS transmits a call end request to the radio cell station CS3 wirelessly connected (seq 81). Then, the radio cell station CS3 transfers the call end request as an inter-CS cooperation procedure to the radio cell station CS1 a current position of which has been registered during cooperation with the CSs (seq 82). The radio cell station CS1 transfers BYE (call disconnection notice) to the management device ME connected to the IP network (seq 83). The management device ME transfers BYE (call disconnection notice) to the IP terminal T (seq 84). On the contrary, the IP terminal T transmits "200OK" (seq 85), and the management device ME transfers "200OK" to the radio cell station CS1 (seq 86).

The radio cell station CS1 that has received "200OK" notifies the cooperating radio cell station CS3 of a state notice (idle) (seq 87). As a result, because the radio cell station CS3 completes the transfer of the CS cooperation/voice data to the radio cell station CS1, the radio cell station CS3 transmits a transfer end request to the radio cell station CS1 (seq 88), and the radio cell station CS1 transmits a transfer end reply (seq 89). In this procedure, the radio cell station CS3 ends the transfer of the voice data in the RIP, and closes the transfer path. That is, the call connection is completed.

Then, the radio cell station CS3 that has confirmed that there is no call connection of the call state issues a position registration deletion request to the radio cell station CS1 (seq 90). On the contrary, the radio cell station CS1 transmits "Un-Register (position registration deletion request)" to the registration server of the management device ME (seq 91). The registration server transmits "200OK" to the radio cell station CS1 (seq 92) with the result that the radio cell station CS1 transmits a position registration deletion reply to the radio cell station CS3 (seq 93).

The radio cell station CS3 that has received the position registration deletion reply transmits the REGISTER (position registration request) to the registration server for the purpose of conducting a final position registration (seq 94), and the registration server transmits "200OK" (seq 95). As a result, the position registration is conducted when ending the call. Accordingly, the position registration of the radio personal station PS is not conducted at a time point of the handover till the call end in the 2×HO call state, and the position registration is conducted only when ending the call. Finally, the radio cell station CS3 transmits a call end reply to the radio personal station PS (seq 96), and the session is disconnected to end the call.

As described above, according to the present invention, the plurality of radio cell stations CS are cooperated with each other so that the number of position registrations during the handover can be remarkably reduced. As illustrated in FIG. 15, when the radio cell stations CS1, CS3, CS4, CS5, and CS2 are connected to the management device ME, if the radio personal station PS travels across the respective cells in the stated order of the radio cell stations CS1, CS3, CS4, CS5, and CS2, the handover and the position registration are conducted as illustrated in FIG. 15.

Figure 32:
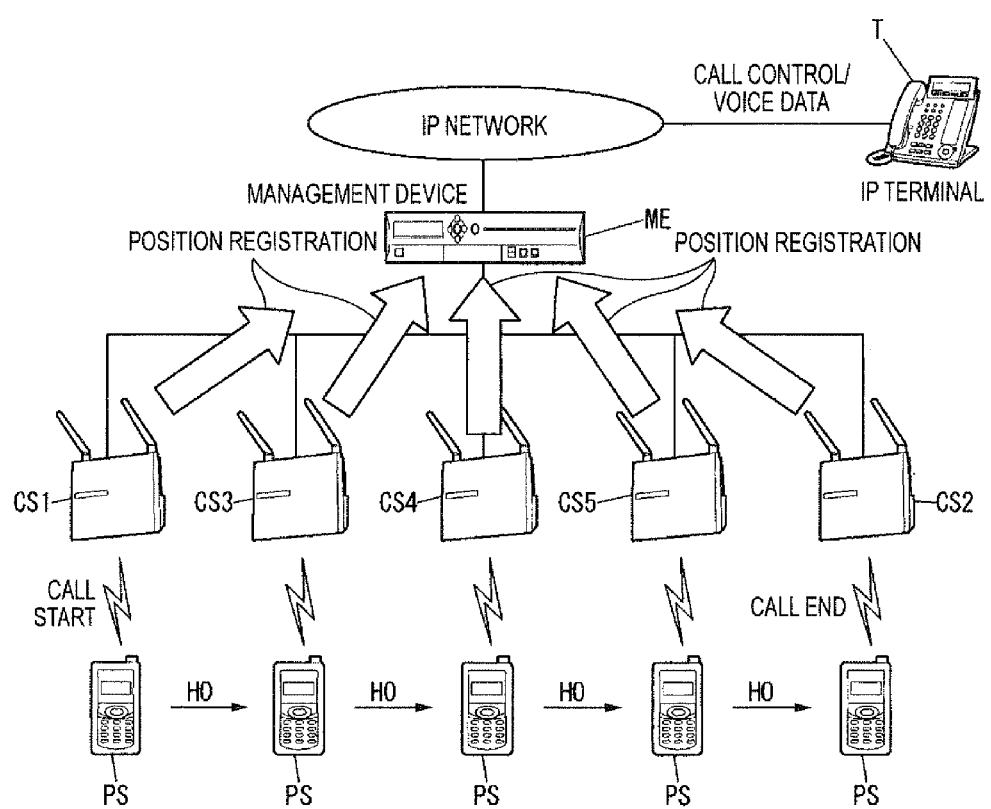
FIG. 32 is an illustrative diagram illustrating handover of a radio terminal in a conventional art.

The handover is controlled every time the radio personal station PS travels between the respective cells. However, the position registration has been already conducted by the radio cell station CS1 when a call starts. After the call, the position registration is conducted by only the radio cell station CS2 when the call ends, and the position registration is not conduced in the radio cell stations CS3, CS4, and CS5. This is largely different from the conventional handover illustrated in FIG. 32. Because the position registration is not conducted in the traveling radio cell stations CS3, CS4, and CS5, a procedure of the CS cooperation illustrated in FIGS. 8, 9 and 11 is merely conducted between the cells where the radio personal station PS is traveling (until the call ends) whereby seamless handover can be realized while reducing the number of position registrations, without making the management device ME and the partner terminal aware of handover. If the registration server of the SIP is mounted in the management device ME, or the management device ME is connected to the registration server of the SIP, a general-purpose management device or a main device functions as the management device ME.

(Resource Relationship of Radio Cell Station CS)

Figure 23:
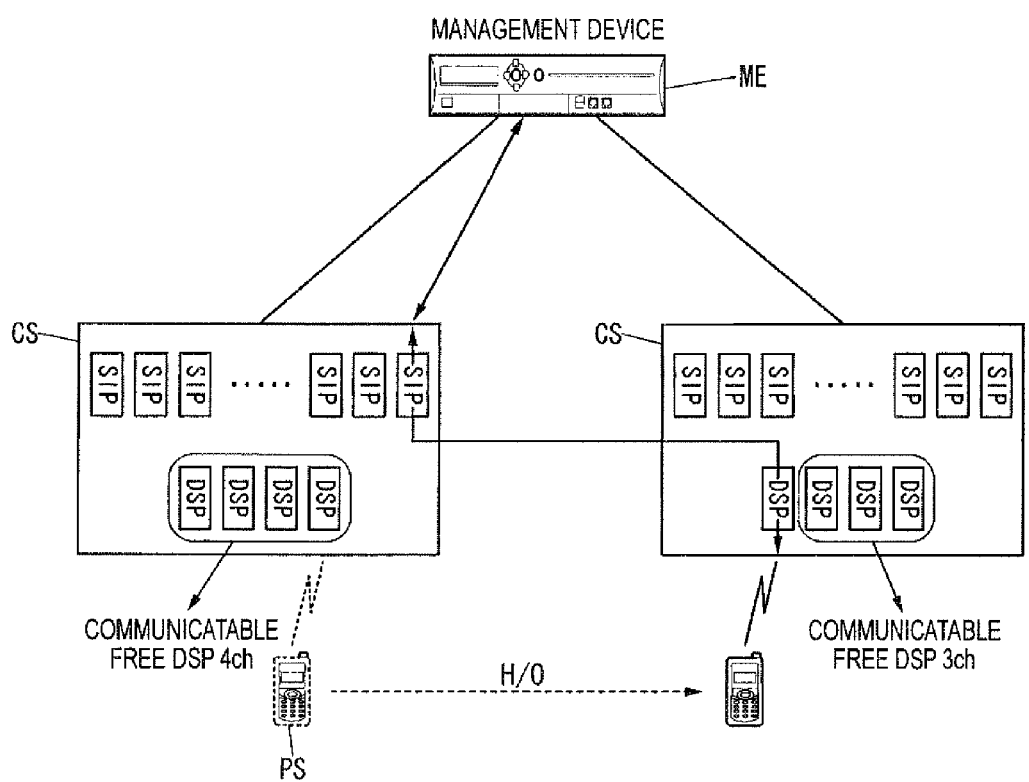
FIG. 23 is an illustrative diagram of a resource relationship when the handover call is controlled in the radio base station device according to the first embodiment of the present invention.

Also, as illustrated in FIG. 23, a resource relationship of the SIP and the DSP in the radio cell station CS during the handover control is dispersed among the plurality of cooperating radio cell stations CS, and shared. FIG. 23 is an illustrative diagram of a resource relationship when the handover call is controlled in the radio cell station according to the first embodiment of the present invention.

The radio personal station PS that communicates with the IP terminal T through the radio cell station CS1 and the IP terminal T communicates with the IP terminal T with the use of one of four DSPs (codec) in the radio cell station CS1 and one of, for example, 264 SIPs (agent) in combination. However, when the radio personal station PS travels, the handover is conducted, and the radio personal station PS is wirelessly connected to the radio cell station CS2, one DSP in the radio cell station CS2 and one SIP in the radio cell station CS1 are used, and dispersedly communicated with the management device ME. The SIP and the DSP can be shared between the respective radio cell stations CS.

That is, with the above configuration, the DSP released by the handover can be used by another radio personal station PS, and even while all of the DSPs in the radio cell station CS1 are being used, if the handover is enabled, the DSP of the radio cell station CS2 can be used for communication.

Incidentally, the handover occurs not only during a call but also during transmission or reception. Hereinafter, the handover control during transmission or reception will be described.

(Procedure when Handover occurs in Transmission State of Radio Personal Station: SIP)

Figure 18:
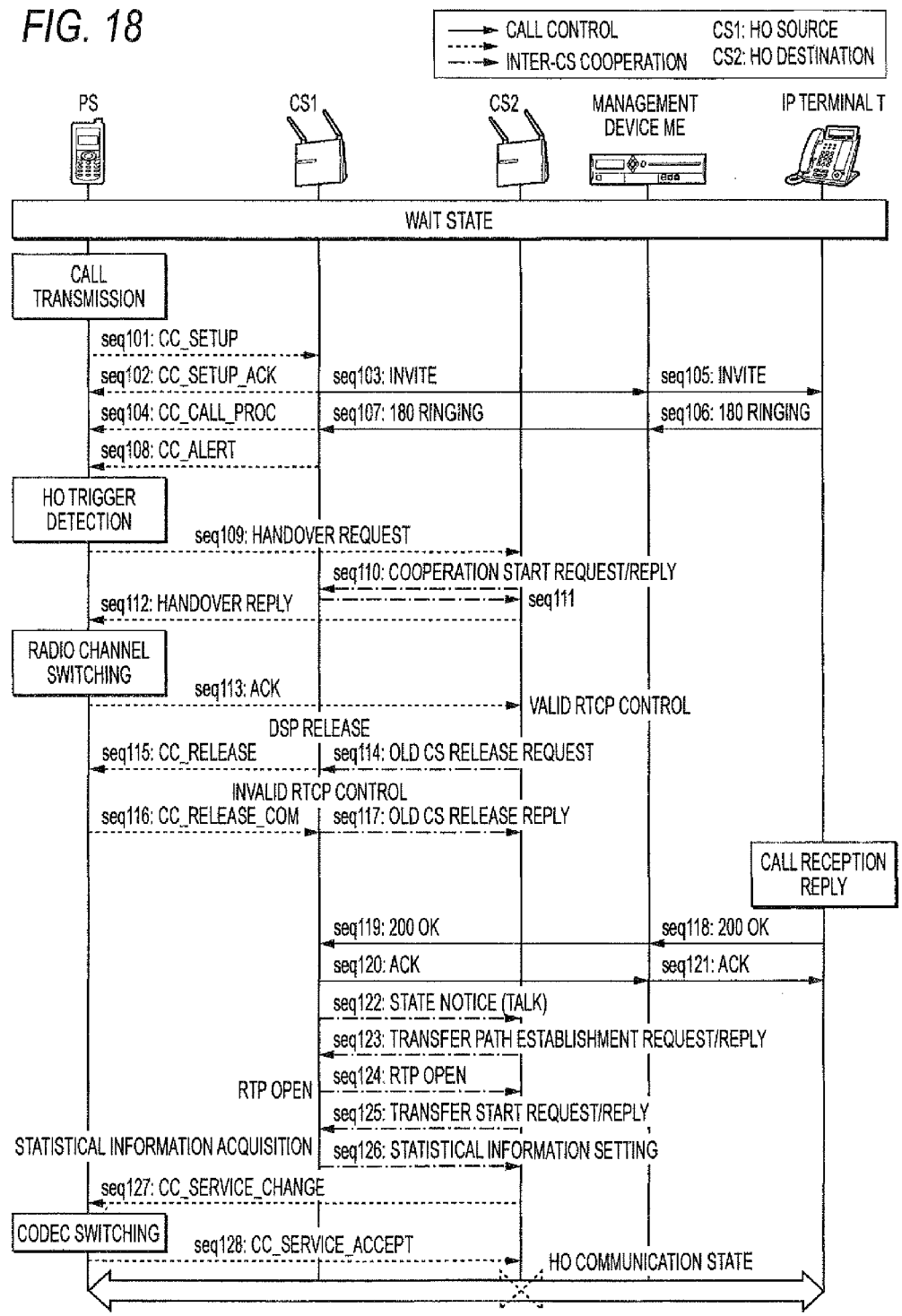
FIG. 18 is an illustrative diagram of a sequence of conducting handover while the radio terminal is transmitting a call in the network in which the radio base station device is arranged according to the first embodiment of the present invention.
Figure 19:
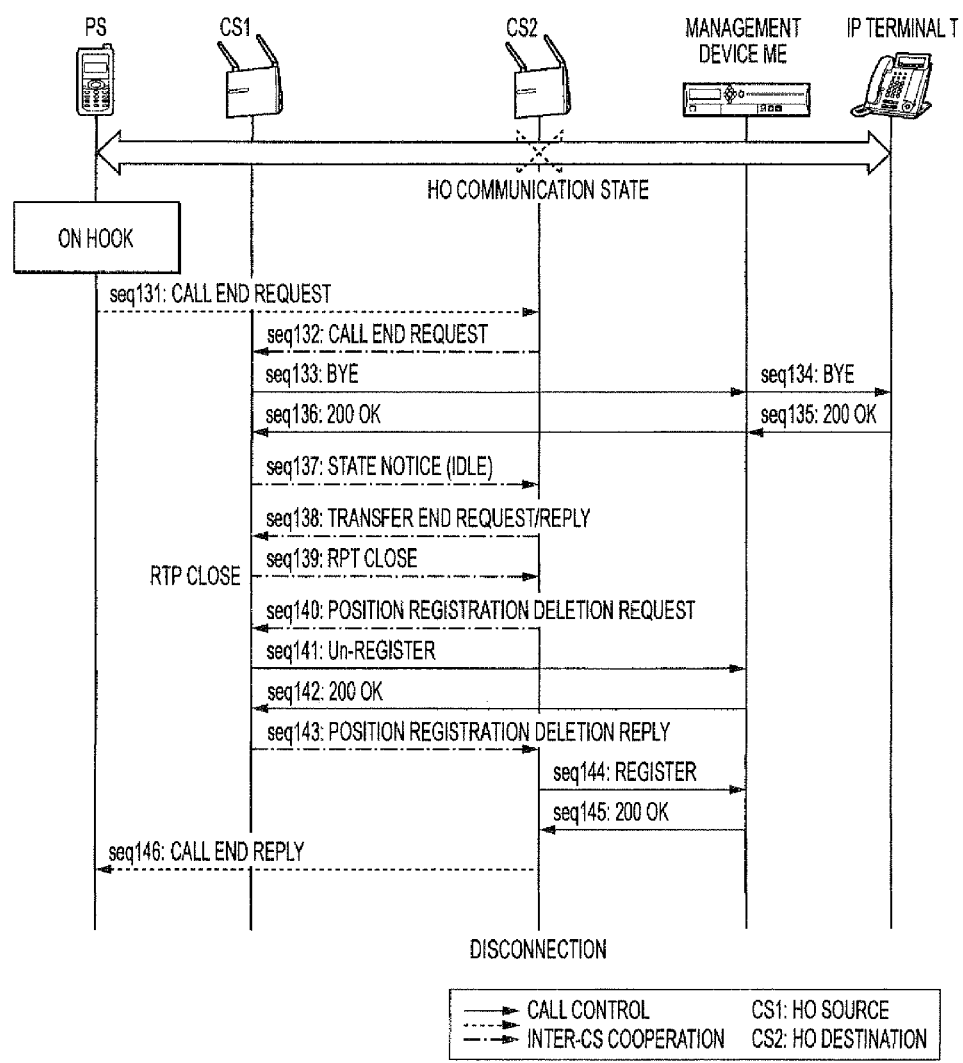
FIG. 19 is an illustrative diagram of a call end sequence of conducting handover while the radio terminal is transmitting a call in the network in which the radio base station device is arranged according to the first embodiment of the present invention.
Figure 20:
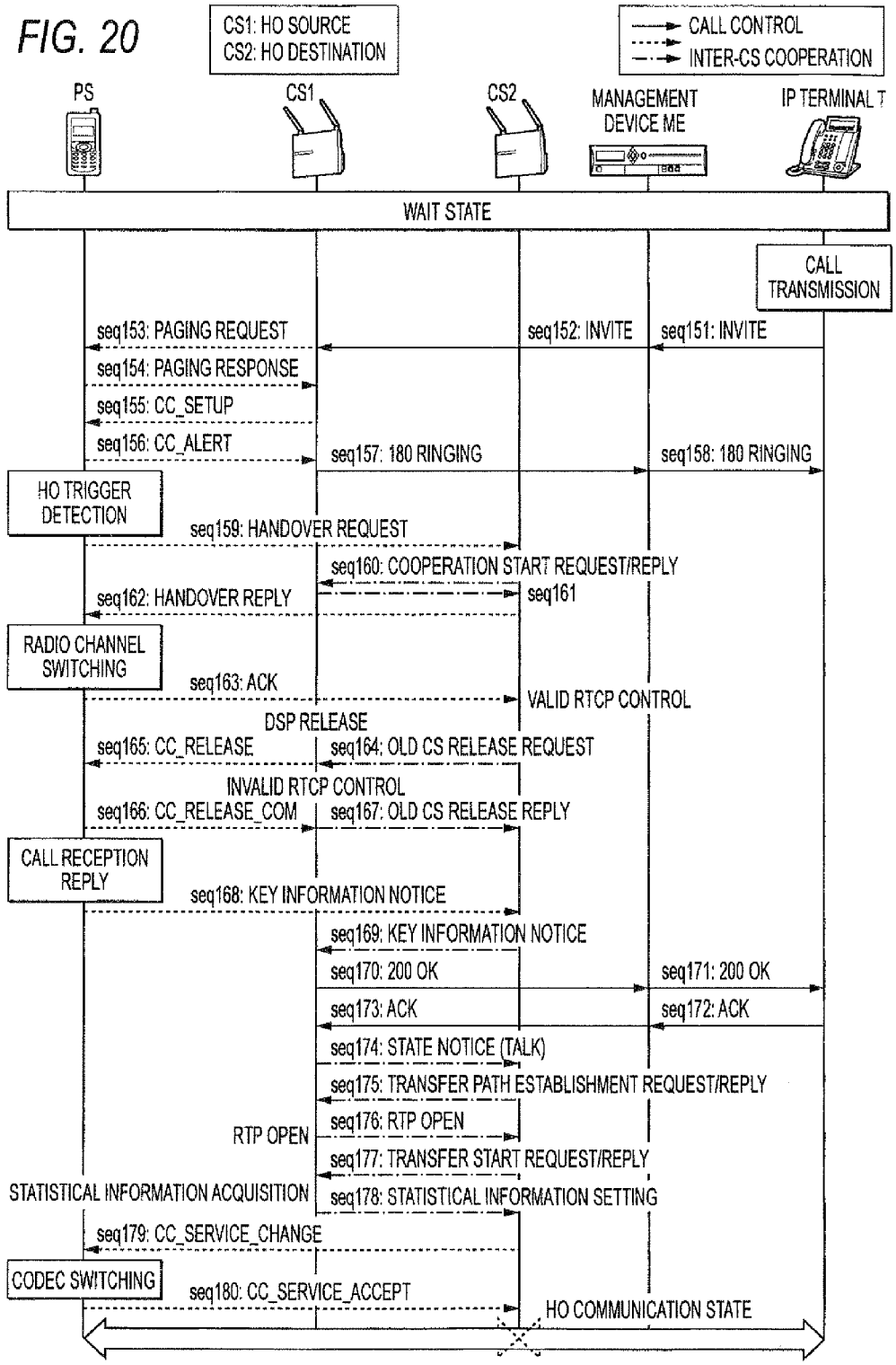
FIG. 20 is an illustrative diagram of a sequence of conducting handover while the radio terminal is receiving a call in the network in which the radio base station device is arranged according to the first embodiment of the present invention.
Figure 21:
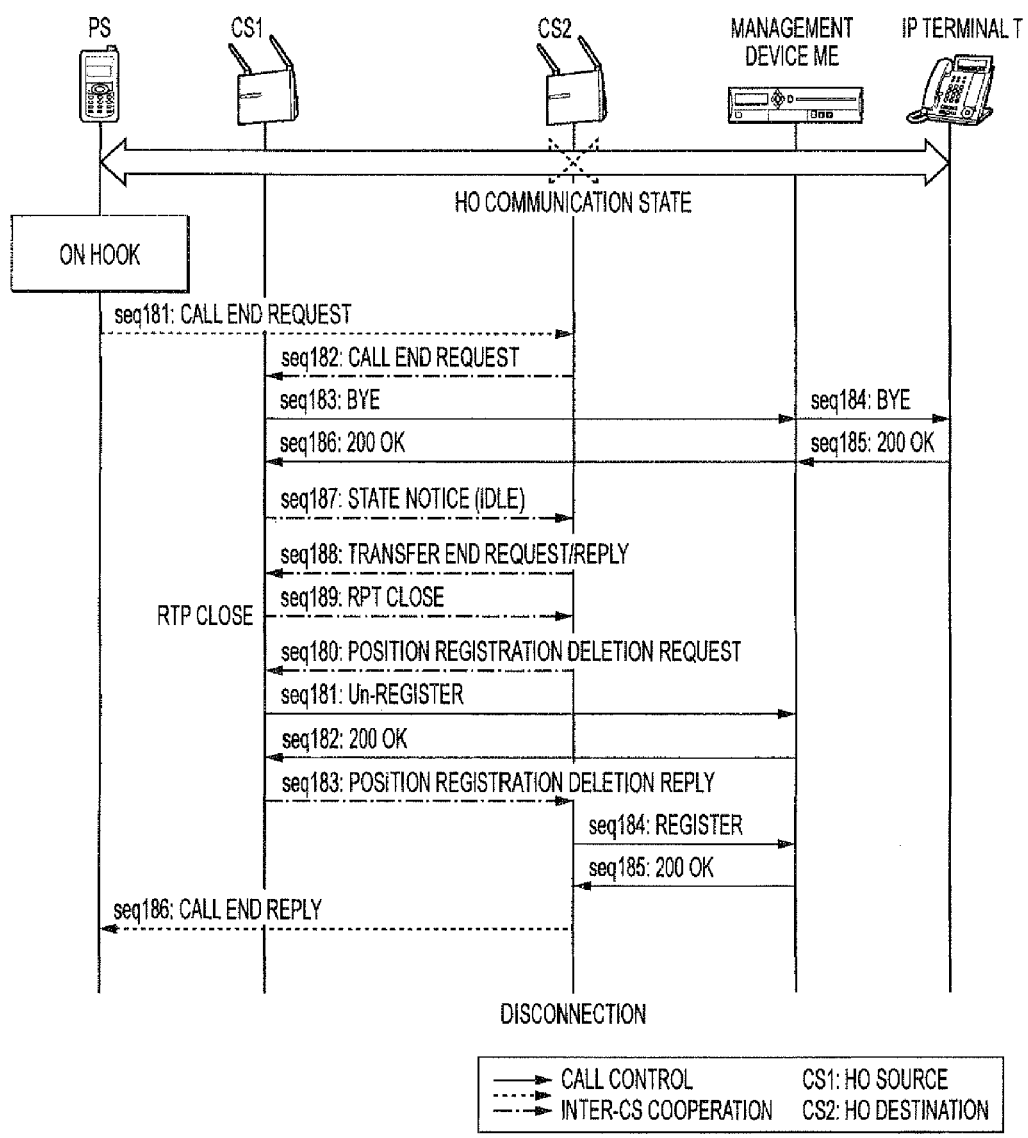
FIG. 21 is an illustrative diagram of a call end sequence of conducting handover while the radio terminal is receiving a call in the network in which the radio base station device is arranged according to the first embodiment of the present invention.
Figure 22:
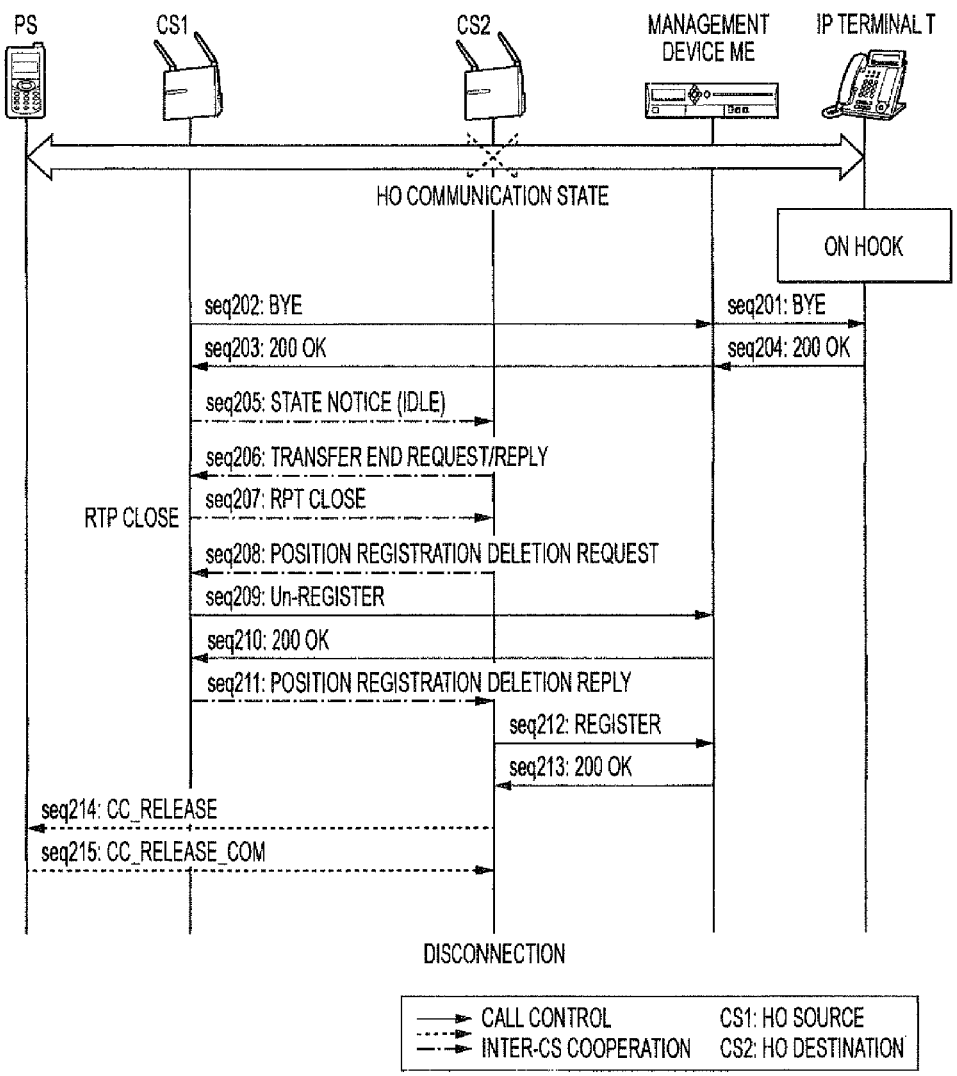
FIG. 22 is an illustrative diagram of a sequence for a communication partner to end the handover call state in the network in which the radio base station device is arranged according to the first embodiment of the present invention.

FIG. 18 is an illustrative diagram of a sequence of conducting handover while the radio terminal is transmitting a call in the network in which the radio cell station is arranged according to the first embodiment of the present invention. FIG. 19 is an illustrative diagram of a call end sequence of conducting handover while the radio personal station is transmitting a call in the network in which the radio cell station is arranged according to the first embodiment of the present invention. FIG. 20 is an illustrative diagram of a sequence of conducting handover while the radio personal station is receiving a call in the network in which the radio cell station is arranged according to the first embodiment of the present invention. FIG. 21 is an illustrative diagram of a call end sequence of conducting handover while the radio personal station is receiving a call in the network in which the radio cell station is arranged according to the first embodiment of the present invention. FIG. 22 is an illustrative diagram of a sequence for a communication partner to end the handover call state in the network in which the radio cell station is arranged according to the first embodiment of the present invention.

A sequence of conducting the handover while the radio personal station PS is transmitting a call will be described with reference to FIG. 18, In the description, it is assumed that a radio communication is conducted in conformity to the DECT. When the radio personal station PS transmits a CC_SETUP (call connection notice) (seq 101), the radio cell station CS1 transmits a CC_SETUP_ACK (call connection reply) (seq 102), and transmits an INVITE (call connection notice) to the management device ME in the SIP (seq 103). Further, the radio cell station CS1 notifies the radio personal station PS of CC_CALL_PROC (call setting processing) (seq 104).

The management device ME that has received an INVITE (call connection notice) transmits the INVITE (call connection notice) to the IP terminal T of a communication partner through the IP network. On the contrary, the IP terminal T transmits "180 ringing" (seq 106), and the management device ME transfers "180 ringing" to the radio cell station CS1 (seq 107). Upon receiving "180 ringing", the radio cell station CS1 transmits a CC_ALERT (during-call notice) to the radio personal station PS (seq 108).

In this state, when the RSSI of the radio personal station PS detects a handover trigger, the radio personal station PS issues a handover request to the radio cell station CS2 in a radio communication (seq 109). On the contrary, the radio cell station CS2 transmits a cooperation start request to the radio cell station CS1 (seq 110). The radio cell station CS1 notifies the radio cell station CS2 of a cooperation start reply to the cooperation start request (seq 111). When the radio cell station CS2 receives the cooperation start reply, a call connection of the radio personal station PS is relayed to the management device ME by the radio cell station CS1 and the radio cell station CS2. Thereafter, the radio cell station CS2 transmits a handover reply to the radio personal station PS (seq 112).

The radio personal station PS switches the radio channel to another one, and transmits an ACK to the radio cell station CS2 (seq 113). As a result, the RTCP control of the radio cell station CS2 can be validated. However, because the call connection has not yet been conducted, and the transfer path has not also been established, the voice data has not yet been transferred.

Then, the radio cell station CS2 transmits an old CS release request to the radio cell station CS1 (seq 114), and the radio cell station CS1 transmits a CC_RELEASE (CS release request) (seq 115), releases the DSP, and invalidates the RTCP control of the radio cell station CS1. The radio personal station PS transmits a CC_RELEASE_COM (CS release reply) (seq 116). The radio cell station CS that has received the CS release reply transmits an old CS release reply to the radio cell station CS2 (seq 117).

Incidentally, the IP terminal T transmits "180 Ringing", starts processing of the received reply, and transmits "200OK (call connection reply)" to the management device ME (seq 118). The management device ME transfers the "200OK" to the radio cell station CS1 (seq 119). Upon receiving "200OK", the radio cell station CS1 transmits an ACK to the management device ME (seq 120), and the management device ME transfers the ACK to the IP terminal T (seq 121).

Further, when the radio cell station CS1 notifies the radio cell station CS1 of a state notice (talk) (seq 122), the radio cell station CS2 transmits a transfer path establishment request to the radio cell station CS1 (seq 123), and the radio cell station CS1 transmits a transfer path establishment reply to the radio cell station CS2 (seq 124). As a result, the radio cell station CS1 and the radio cell station CS2 open the RTP transfer path. In this example, the radio cell station CS2 transmits a transfer start request to the radio cell station CS1 (sec 125), and the radio cell station CS1 transmits a transfer start reply to the radio cell station CS2 (seq 126). As a result, the radio cell station CS2 acquires statistical information such as the number of RTP transmission packets or the number of RTP loss packets of the radio cell station CS1, and the radio cell station CS2 sets the statistical information in the memory 16. Thereafter, the radio cell station CS2 notifies the radio personal station PS of a CC_SERVICE_CHANGE (codec switching request) (seq 127), and the radio personal station PS switches the codec to another one as required, and notifies the radio cell station CS2 of a CC_SERVICE_ACCEPT (codec switching reply) (seq 128). Seqs 110, 111, 114, 117, and 122 to 126 are executed according to a procedure unique to the present invention.

Through the above procedure, the radio cell station CS1 and the radio cell station CS2 are cooperated with each other, the handover is conducted from the radio cell station CS1 to the radio cell station CS2 while the radio personal station PS is transmitting a call.

(Call End Procedure after Handover is conducted in Transmission State of Radio Personal Station: SIP)

In the above state, when the radio personal station PS becomes on-hook, the radio personal station PS transmits a call end request to the radio cell station CS2 wirelessly connected as illustrated in FIG. 19 (seq 131). Then, the radio cell station CS2 transfers a call end request as an inter-CS cooperation procedure to the radio cell station CS1 a current position of which has been registered during cooperation between the CSs (seq 132). The radio cell station CS1 transmits a BYE (call disconnection notice) to the management device ME connected to the IP network (seq 133). The management device ME transfers the BYE (call disconnection notice) to the IP terminal T (seq 134). On the contrary, the IP terminal T transmits "200OK" (seq 135), and the management device ME transfers "200OK" to the radio cell station CS1 (seq 136).

The radio cell station CS1 that has received "200OK" notifies the cooperating radio cell station CS2 of a state notice (idle) (seq 137). The radio cell station CS2 transmits a transfer end request to the radio cell station CS1 (seq 138), and the radio cell station CS1 transmits a transfer end reply (seq 139). In this procedure, the radio cell station CS2 completes the transfer of the voice data in the RTP, and closes the transfer path. That is, the call connection is ended.

Then, the radio cell station CS2 that has confirmed that there is no call connection of the call state issues a position registration deletion request to the radio cell station CS1 (seq 140). On the contrary, the radio cell station CS1 transmits "Un-Register (position registration deletion request)" to the registration server of the management device ME (seq 141). The registration server transmits "200OK" to the radio cell station CS1 (seq 142), and the radio cell station CS1 that has received "200OK" transmits a position registration deletion reply to the radio cell station CS2 (seq 143).

The radio cell station CS2 that has received the position registration deletion reply transmits the REGISTER (position registration request) to the registration server for the purpose of conducting a final position registration (seq 144), and the registration server transmits "200OK" (seq 145). As a result, the position registration is conducted when ending the call. Seqs 132, 137 to 140, and 143 are executed according to a procedure unique to the present invention.

Accordingly, the position registration of the radio personal station PS is not conducted at a time point of the handover since the call starts until the call ends, and the position registration is conducted only when ending the call where the REGISTER (position registration request) is transmitted. Therefore, the radio cell station CS2 transmits a call end reply to the radio personal station PS (seq 146), and the session is disconnected to end the call.

(Procedure when Handover occurs in Reception State of Radio Personal Station: SIP)

Subsequently, a sequence of conducting the handover while the radio personal station PS is receiving a call will be described with reference to FIG. 20. In the description, it is assumed that a radio communication is conducted in conformity to the DECT, and the communication is conducted between the radio cell station CS1 and the IP terminal T in conformity to the SIP.

When the IP terminal T that is a communication partner becomes on-hook, and the radio personal station PS is called, transmission processing starts, and an INVITE (call connection notice) is transmitted from the IP terminal T to the management device ME through the IP network (seq 151), and the INVITE (call connection notice) is transferred from the management device ME to the radio cell station CS1 (seq 152). The radio cell station CS1 that has received the INVITE (call connection notice) transmits "Paging Request" to the radio personal station PS (seq 153) whereas the radio personal station PS transmits "Paging Response" to the "paging request" (seq 154).

In this example, the radio cell station CS1 transmits a CC_SETUP (call connection notice) to the radio personal station PS (seq 155), and the radio personal station PS transmits a CC_ALERT (during-call notice) (seq 156). The radio cell station CS1 transmits "180 Ringing" (seq 157), and the management device ME transfers "180 Ringing" to the IP terminal T (seq 158). As a result, the radio personal station PS is receiving a call.

In this state, when the RSSI of the radio personal station PS detects a handover trigger, the radio personal station PS issues a handover request to the radio cell station CS2 in a radio communication (seq 159). On the contrary, the radio cell station CS2 transmits a cooperation start request to the radio cell station CS2 (seq 160). The radio cell station CS1 notifies the radio cell station CS2 of a cooperation start reply to the cooperation start request (seq 161). When the radio cell station CS2 receives the cooperation start reply, a call connection of the radio personal station PS is relayed to the management device ME by the radio cell station CS1 and the radio cell station CS2. Thereafter, the radio cell station CS2 transmits a handover reply to the radio personal station PS (seq 162).

The radio personal station PS switches the radio channel to another one, and transmits an ACK to the radio cell station CS2 (seq 163). As a result, the RTCP control of the radio cell station CS2 can be validated. However, because the call connection has not yet been conducted, and the transfer path has not also been established, the voice data has not yet been transferred.

Then, the radio cell station CS2 transmits an old CS release request to the radio cell station CS1 (seq 164), and the radio cell station CS1 transmits a CC_RELEASE (CS release request) (seq 165), releases the DSP, and invalidates the RTCP control of the radio cell station CS1. The radio personal station PS transmits a CC_RELEASE_COM (CS release reply) (seq 166). The radio cell station CS that has received the CS release reply transmits an old CS release reply to the radio cell station CS2 (seq 167).

When the radio personal station PS replies to reception, the radio personal station PS conducts a key information notice of the reception reply (seq 168), and the radio cell station CS2 notifies the radio cell station CS1 of the key information notice (seq 169). The radio cell station CS1 transmits "2000K (call connection reply" to the management device ME (seq 170), and the management device ME transfers the "2000K" to the IP terminal T (seq 171). Upon receiving "2000K", the IP terminal T transmits an ACK to the management device ME (seq 172), and the management device ME transfers the ACK to the radio cell station CS1 (seq 173).

Because the radio cell station CS1 is call-connected to the IP terminal T, when the radio cell station CS1 notifies the radio cell station CS2 of a state notice (talk) (seq 174), the radio cell station CS2 transmits a transfer path establishment request to the radio cell station CS1 (seq 175), and the radio cell station CS1 transmits a transfer path establishment reply to the radio cell station CS2 (seq 176). As a result, the radio cell station CS1 and the radio cell station CS2 open the RTP transfer path. In this example, the radio cell station CS2 transmits a transfer start request to the radio cell station CS1 (seq 177), and the radio cell station CS1 transmits a transfer start reply to the radio cell station CS2 (seq 178). According to the transfer start request/reply, the radio cell station CS2 acquires statistical information such as the number of RTP transmission packets or the number of RTP loss packets of the radio cell station CS1, and the radio cell station CS2 sets the statistical information in the memory 16. Thereafter, the radio cell station CS2 notifies the radio personal station PS of a CC_SERVICE_CHANGE (codec switching request) (seq 179), and the radio personal station PS switches the codec to another one as required, and notifies the radio cell station CS2 of a CC_SERVICE_ACCEPT (codec switching reply) (seq 180). Seqs 160, 161, 164, 167, 169, and 174 to 178 are executed according to a procedure unique to the present invention.

(Call End Procedure after Handover occurs in Reception State of Radio Personal Station: SIP)

A sequence of a call end of conducting the handover when the radio personal station PS receives a call will be described. Referring to FIG. 21, when the radio personal station PS becomes on-hook, the radio personal station PS transmits a call end request to the radio cell station CS2 wirelessly connected (seq 181). Then, the radio cell station CS2 transfers a call end request as an inter-CS cooperation procedure to the radio cell station CS1 a current position of which has been registered during cooperation between the CSs (seq 182). The radio cell station CS1 transmits a BYE (call disconnection notice) to the management device ME connected to the IP network (seq 183). The management device ME transfers the BYE (call disconnection notice) to the IP terminal T (seq 184). On the contrary, the IP terminal T transmits "2000K" (seq 185), and the management device ME transfers "2000K" to the radio cell station CS1 (seq 186).

The radio cell station CS1 that has received "2000K" notifies the cooperating radio cell station CS2 of a state notice (idle) (seq 187). The radio cell station CS2 transmits a transfer end request to the radio cell station CS1 (seq 188), and the radio cell station CS1 transmits a transfer end reply to the radio cell station CS2 (seq 189). In this procedure, the radio cell station CS2 completes the transfer of the voice data in the RTP, and closes the RTP transfer path. That is, the call connection is ended.

Then, the radio cell station CS2 that has confirmed that there is no call connection of the call state issues a position registration deletion request to the radio cell station CS1 (seq 190). On the contrary, the radio cell station CS1 transmits "Un-Register (position registration deletion request)" to the registration server of the management device ME (seq 191). The registration server transmits "2000K" to the radio cell station CS1 (seq 192) with the result that the radio cell station CS1 transmits a position registration deletion reply to the radio cell station CS2 (seq 193).

The radio cell station CS2 that has received the position registration deletion reply transmits the REGISTER (position registration request) to the registration server for the purpose of conducting a final position registration (seq 194), and the registration server transmits "2000K" (seq 195). As a result, the position registration is conducted when ending the call. Seqs 182, 187 to 190, and 193 are executed according to a procedure unique to the present invention.

Accordingly, the position registration of the radio personal station PS is not conducted at a time point of the handover until the call ends, and the position registration is conducted only when ending the call. Finally, the radio cell station CS2 transmits a call end reply to the radio personal station PS (seq 196), and the session is disconnected to end the call.

(Call End Procedure when Communication Partner Ends Call during Call in Association with CSs: SIP)

Finally, a description will be given of a sequence for a communication partner to end a call during a handover call. Referring to FIG. 22, when the IP terminal T that is a communication partner becomes on hook, the IP terminal T transmits a BYE (call disconnection notice) to the management device ME (seq 201), and the management device ME transfers the BYE (call disconnection notice) to the radio cell station CS1 (seq 202). On the contrary, the radio cell station CS1 transmits "2000K" to the management device ME (seq 203), and the management device ME transmits "2000K" to the IP terminal T (seq 204).

The radio cell station CS1 that has transmitted "2000K" notifies the cooperating radio cell station CS2 of a state notice (idle) (seq 205). The radio cell station CS2 transmits a transfer end request to the radio cell station CS1 (seq 206), and the radio cell station CS1 transmits a transfer end reply to the radio cell station CS2 (seq 207). In this procedure, the radio cell station CS2 completes the transfer of the voice data in the RTP, and closes the RTP transfer path. That is, the call connection is ended.

Then, the radio cell station CS2 that has confirmed that there is no call connection of the call state issues a position registration deletion request to the radio cell station CS1 (seq 208). On the contrary, the radio cell station CS1 transmits "Un-Register (position registration deletion request)" to the registration server of the management device ME (seq 209). The registration server transmits "2000K" to the radio cell station CS1 (seq 210) with the result that the radio cell station CS1 transmits a position registration deletion reply to the radio cell station CS2 (seq 211).

The radio cell station CS2 that has received the position registration deletion reply transmits the REGISTER (position registration request) to the registration server for the purpose of conducting a final position registration (seq 212), and the SIP server transmits "2000K" (seq 213).

Thereafter, the radio cell station CS2 transmits a CC_RELEASE (CS release request) to the radio personal station PS (seq 214), and the radio personal station PS transmits a CC_RELEASE_COM (CS release reply) to the radio cell station CS2 (seq 215). As a result, the position registration is conducted only when ending the call whereas the position registration is not conducted when conducting the other handover, and the session is disconnected to end the call. Seqs 205 to 208, and 211 are executed according to a procedure unique to the present invention.

(Temporal and Spatial Relationship between Handover and Position Registration during Call)

As described above, a state in which the position registration control and the handover control are conducted when the radio personal station PS travels between the respective cells of the radio cell stations CS1, CS2, CSn will be described according to a spatial arrangement of the radio personal station PS with respect to the radio cell stations CS1, CS2, CSN, and an elapsed time.

Figure 24:
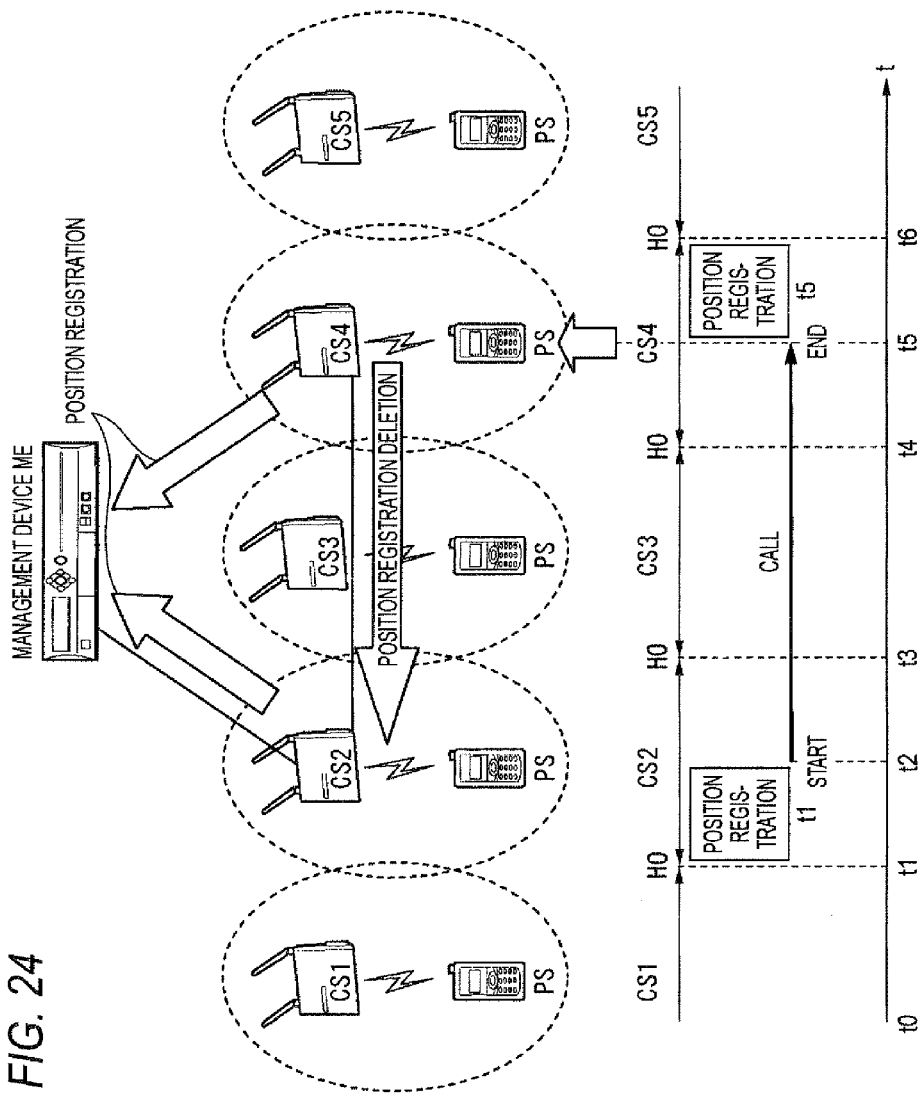
FIG. 24 is an illustrative diagram of a temporal and spatial state where handover and position registration are conducted in the network in which the radio base station device is arranged according to the first embodiment of the present invention.
Figure 25:
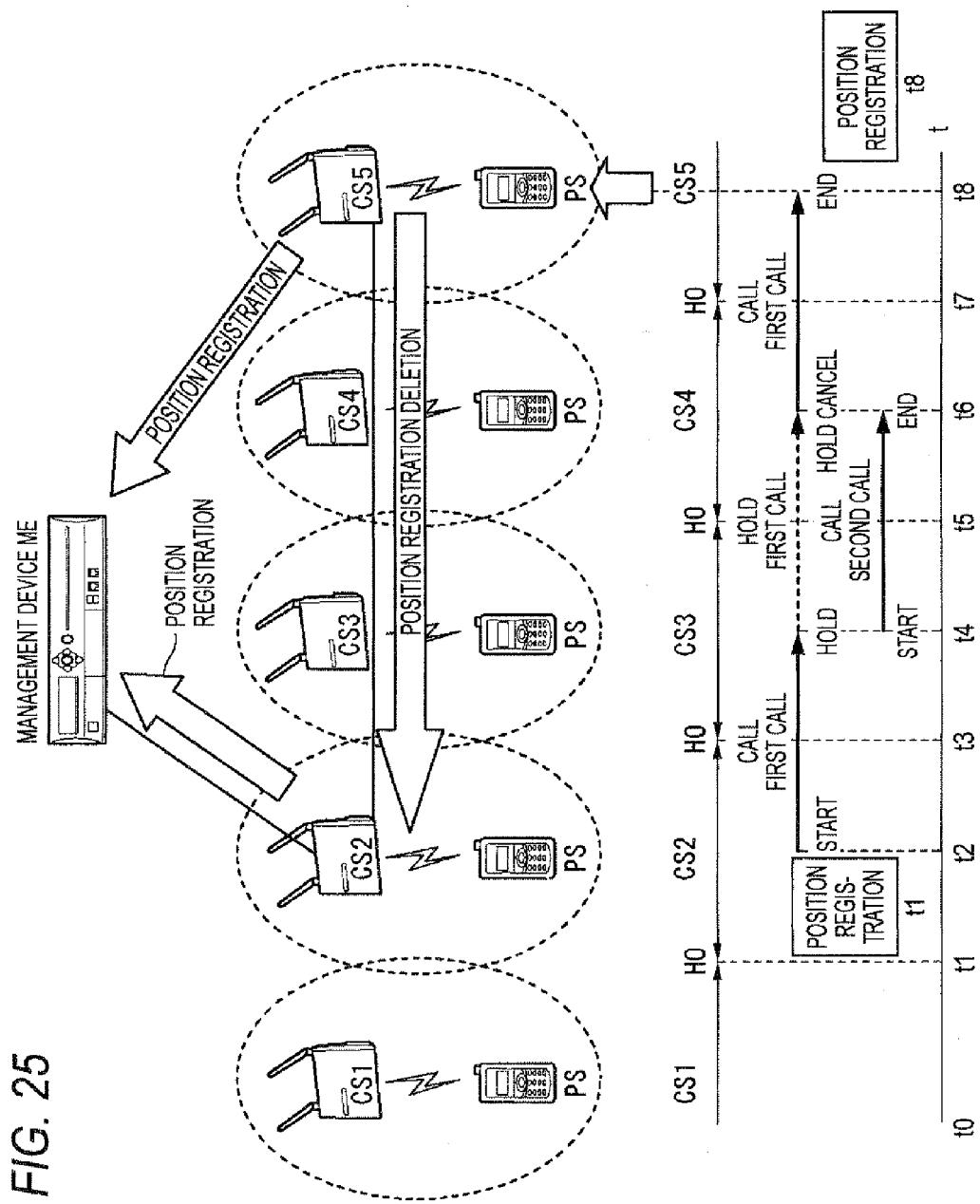
FIG. 25 is an illustrative diagram of a temporal and spatial state where handover and position registration are conducted when a second call reception is conducted during a call in the network in which the radio base station device is arranged according to the first embodiment of the present invention.
Figure 26:
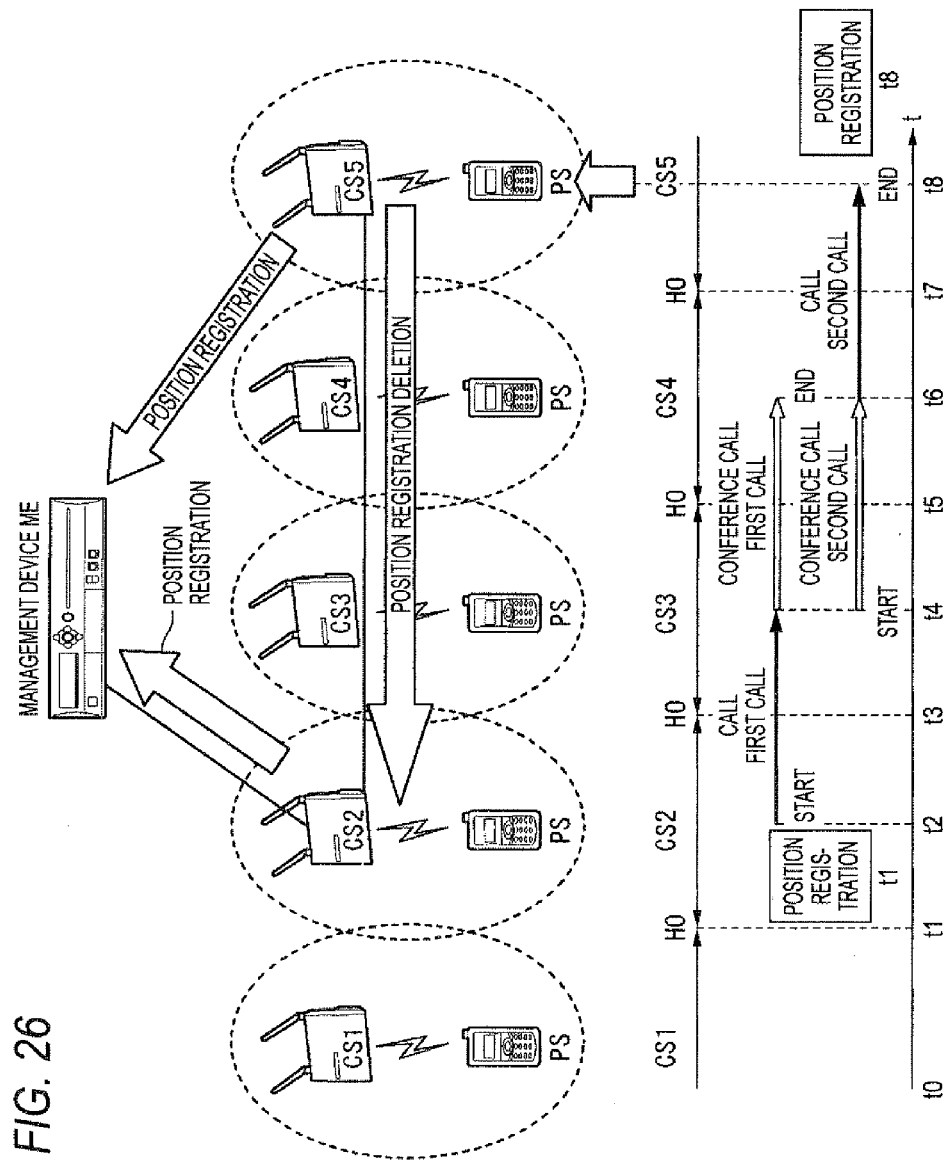
FIG. 26 is an illustrative diagram of a temporal and spatial state where handover and position registration are conducted when a conference call is conducted in the network in which the radio base station device is arranged according to the first embodiment of the present invention.

FIG. 24 is an illustrative diagram of a temporal and spatial state where handover and position registration are conducted in the network in which the radio cell station is arranged according to the first embodiment of the present invention. FIG. 25 is an illustrative diagram of a temporal and spatial state where handover and position registration are conducted when a second call reception is conducted during a call in the network in which the radio cell station is arranged according to the first embodiment of the present invention. FIG. 26 is an illustrative diagram of a temporal and spatial state where handover and position registration are conducted when a conference call is conducted in the network in which the radio cell station is arranged according to the first embodiment of the present invention.

A first case of the spatial and temporal relationship shows a relationship in position registration between the waiting handover and the calling handover. Referring to FIG. 24, at a time t0, the radio personal station PS exists in the cell of the radio cell station CS1. In this state, the radio personal station PS does not call, but notifies the radio cell station CS1 of the position registration request, and the radio cell station CS1 positionally registers its own IP address and the phone number of the radio personal station PS in the management device ME. This procedure is conducted according to FIGS. 8 and 9.

When the radio personal station PS travels from the cell of the radio cell station CS1 to the cell of the radio cell station CS2 at a time t1, the handover is controlled, and the radio cell station CS2 conducts the position registration at a timing when the handover trigger is detected. At a time t2 while the radio personal station PS is traveling in the cell of the radio cell station CS2, a call between the radio personal station PS and another terminal, for example, the IP terminal T starts.

At a time t3, the radio personal station PS travels from the cell of the radio cell station CS2 to the cell of the radio cell station CS3 while calling. In this situation, the handover is controlled. However, in the first embodiment, the position registration is not conducted during this handover by cooperation between the radio cell station CS2 and the radio cell station CS3. Further, at a time t4, the radio personal station PS travels from the cell of the radio cell station CS3 to the cell of the radio cell station CS4. In this situation, the handover is controlled. However, in this case, similarly, the position registration is not conducted during the handover by cooperation between the radio cell station CS2 and the radio cell station CS4.

In this state, the radio personal station PS travels within the cell of the radio cell station CS4, and at a time t5, a call of the radio personal station PS is ended. In this situation, the radio cell station CS4 notifies the radio cell station CS2 of a position registration deletion request as illustrated in FIG. 24, and the radio cell station CS2 issues the position registration deletion request to the management device ME. Then, the radio cell station CS4 issues the position registration request to the management device ME. In this way, the position registration is not conducted during a call, but conducted only when the call is ended.

(Temporal and Spatial Relationship between Handover and Position Registration during Call, Hold, and Cancel)

A second case of the spatial and temporal relationship shows a relationship between the handover and the position registration in a call state, in a hold state, and after a hold cancel, including a waiting state. In FIG. 25, at a time t0, the radio personal station PS is traveling in the cell of the radio cell station CS1, and exists in this cell. The radio personal station PS notifies the radio cell station CS1 of a position registration request, and the radio cell station CS1 registers its own IP address and the phone number of the radio personal station PS in the management device ME.

At the time t1, when the radio personal station PS travels from the cell of the radio cell station CS1 to the cell of the radio cell station CS2, the handover is controlled, and the radio cell station CS2 is positionally registered at a timing when the handover trigger is detected. At this time, a call has not yet been conducted. However, at the time t2 while the radio personal station PS is traveling in the cell of the radio cell station CS2, the call of the radio personal station PS starts.

At the time t3, the radio personal station PS travels from the cell of the radio cell station CS2 to the cell of the radio cell station CS3 while calling. In this situation, the handover is controlled. However, in the first embodiment, the position registration is not conducted in the handover control by cooperation between the radio cell station CS2 and the radio cell station CS3. Further, at the time t4, the radio personal station PS receives a call, puts the call (first call) on hold, and starts to answer a second call newly generated. The radio personal station PS travels from the cell of the radio cell station CS to the cell of the radio cell station CS4 at the time t5 while being connected to the second call. That is, a plurality of call connections generated by the respective radio personal stations PS are controlled at the same time for at least given time (in this example, from t4 to t5). In this situation, the handover is controlled where the position registration is not conducted in the handover by cooperation with the radio cell station CS2 and the radio cell station CS4.

At a time t6, when the connection of the radio personal station PS to the second call is disconnected to end the call, hold of the first call is canceled, and the first call is restarted. The information on the first call put on hold is transferred as cooperation data from the radio cell station CS2 to the radio cell station CS4, and the radio personal station PS can restart the call (first call) immediately. After the call is restarted, at a time t7, the radio personal station PS travels from the cell of the radio cell station CS4 to the cell of the radio cell station CS5. Similarly, in this situation, although the handover is controlled, the position registration is not conducted by cooperation with the radio cell station CS2 and the radio cell station CS5.

Thereafter, the radio personal station PS travels within the cell of the radio cell station CS5, and at a time t8, the radio personal station PS becomes off-hook, and the call is ended. In this situation, as illustrated in FIG. 25, the radio cell station CS5 notifies the radio cell station CS2 of a position registration deletion request, and the radio cell station CS2 issues the position registration deletion request to the management device ME. Further, the radio cell station CS5 issues a position registration request to the management device ME. Accordingly, the position registration is conducted only when the call is ended after the call starts.

(Temporal and Spatial Relationship between Handover Control and Position Registration Control during Call and Conference Call)

A third case of the spatial and temporal relationship shows a relationship between the handover control and the position registration in a wait state, in a call state, in a conference call state, and after a conference call cancel. In FIG. 26, at a time t0, the radio personal station PS is traveling in the cell of the radio cell station CS1, and exists in this cell. The radio personal station PS notifies the radio cell station CS1 of a position registration request, and the radio cell station CS1 positionally registers its own IP address and the phone number of the radio personal station PS in the management device ME.

At the time t1, when the radio personal station PS travels from the cell of the radio cell station CS1 to the cell of the radio cell station CS2, the handover is controlled, and the radio cell station CS2 is positionally registered at a timing when the handover trigger is detected. At this time, a call has not yet been conducted. However, at the time t2 while the radio personal station PS is traveling in the cell of the radio cell station CS2, the call (first call) of the radio personal station PS starts.

At the time t3, the radio personal station PS travels from the cell of the radio cell station CS2 to the cell of the radio cell station CS3 while calling. In this situation, the handover is controlled. However, in the first embodiment, the position registration is not conducted in the handover control by cooperation between the radio cell station CS2 and the radio cell station CS3. Further, at the time t4, the radio personal station PS transmits a call (second call) to a conference call partner, and after the time t4, a conference call including the first call and the second call to the radio personal station PS is started.

At a time t5, the radio personal station PS travels from the cell of the radio cell station CS to the cell of the radio cell station CS4 while continuing the conference at the time t5. In this situation, the handover is controlled, and similarly the position registration is not conducted by cooperation with the CSs with only a difference that the call is the conference call.

At a time t6, the first call to the radio personal station PS is ended, only the first call is disconnected, and only the call (second call) is continued. After the call (second call) is restarted, the radio personal station PS travels from the cell of the radio cell station CS4 to the cell of the radio cell station CS5 at a time t7. Similarly, in this case, the handover control is conducted, but the position registration is not conducted by cooperation with the radio cell station CS2 and the radio cell station CS5.

Thereafter, the radio personal station PS travels within the cell of the radio cell station CS5, and at a time t8, when the radio personal station PS becomes off-hook, and the call is ended. In this situation, as illustrated in FIG. 26, the radio cell station CS5 notifies the radio cell station CS2 of a position registration deletion request, and the radio cell station CS2 issues a position registration deletion request to the management device ME. Further, the radio cell station CS5 issues a position registration request to the management device ME. Accordingly, the position registration is conducted only when the call is ended after the call starts.

As is apparent from the above description, the radio cell station CS can provide seamless handover even in the service of the call connection when the second call or more calls occur during the call. For that reason, the call control unit 15 of the radio cell station CS can controls a plurality of call connections generated by the respective radio personal stations PS at the same time for at least a given time. The network control unit 14 has a function of requesting the position registration of the management device ME when all of the plural call connections are ended without requesting the position registration of the management device ME while at least one call connection is conducted.

The call formed by the plurality of call connections includes a conference call in which, for example, two voice calls are combined into one call state, and a teleconference that enables two or more call states. Also, there is a case in which one of the plural voice calls is established, and other calls are put on hold. In the teleconference, a data call of images or texts is also connected to the voice call as plural calls.

Anyway, the network control unit 14 does not request the position registration of the management device ME while at least one call connection is conducted, and requests the position registration of the management device ME when all of call connections are ended. As a result, even if a plurality of call connections occurs, seamless handover can be realized while reducing the number of position registrations during the call, without making the management device and the partner terminal aware of handover.

(Processing in Radio Cell Station CS)

Figure 27:
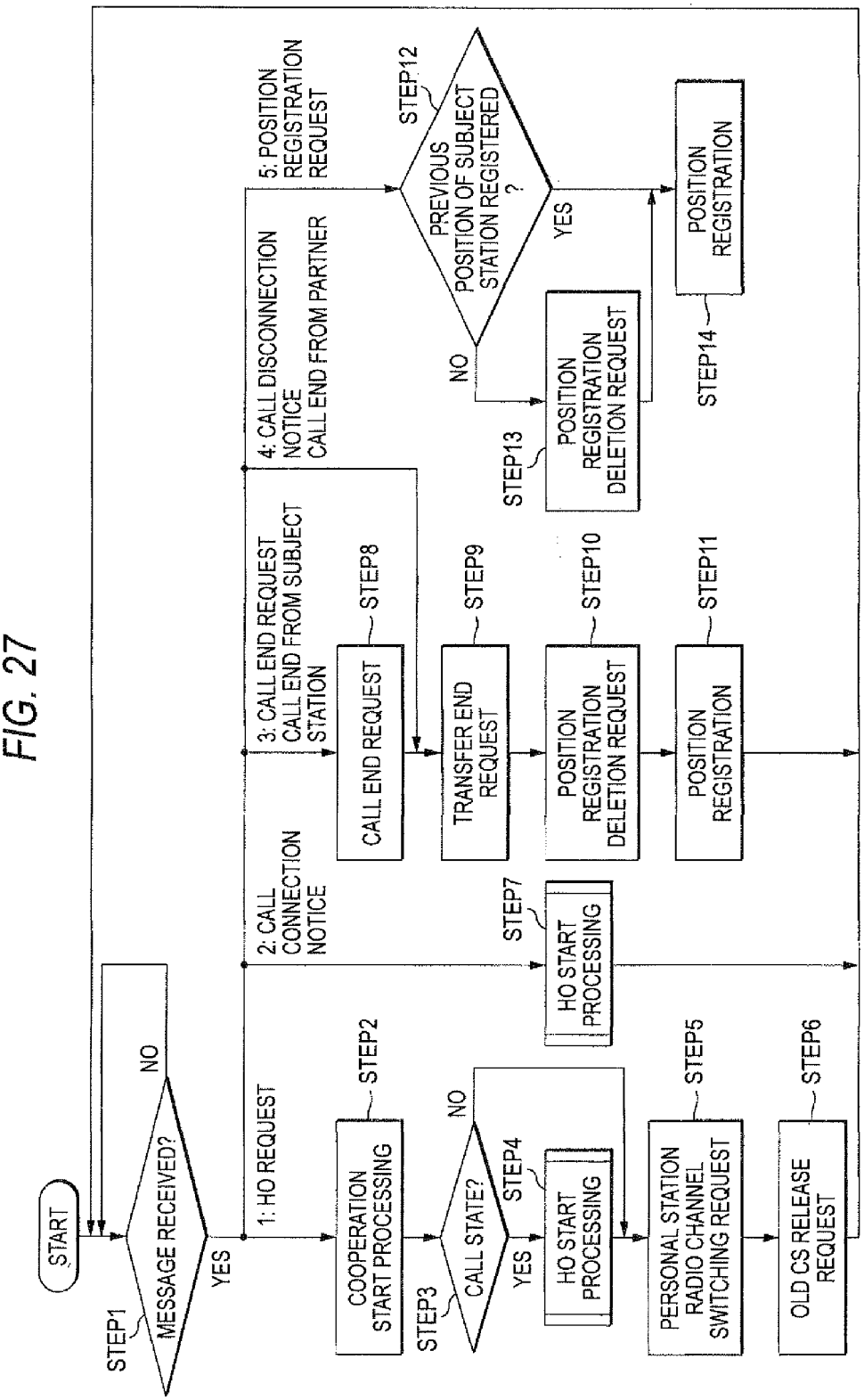
FIG. 27 is a flowchart illustrating processing of a radio base station device of a handover destination according to the first embodiment of the present invention.
Figure 28:
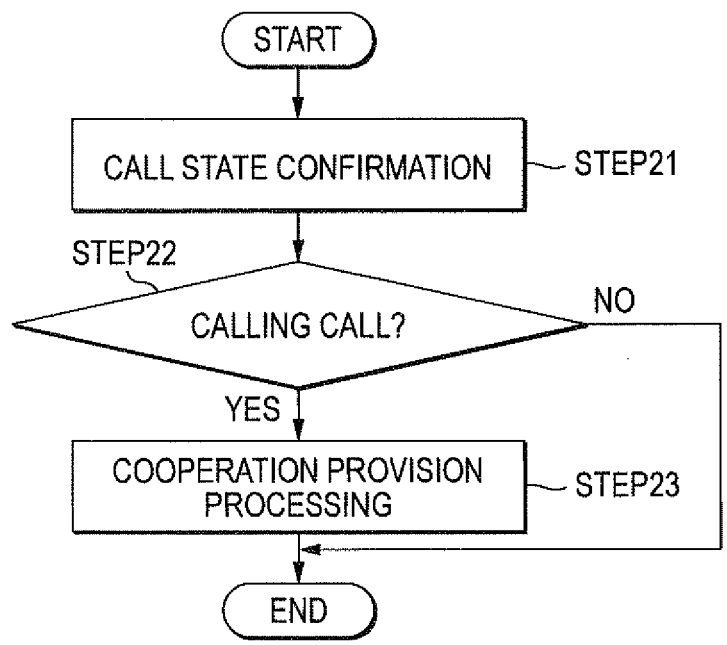
FIG. 28 is a flowchart illustrating a cooperation start process of the position-registered radio base station device (of a handover source) according to the first embodiment of the present invention.
Figure 29:
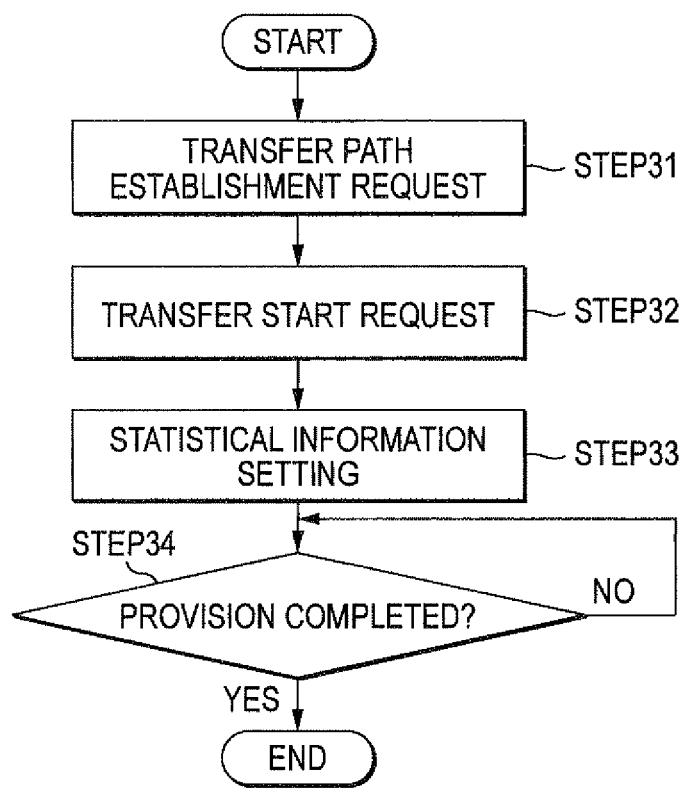
FIG. 29 is a flowchart illustrating an HO start process of the radio base station device of a handover destination according to the first embodiment of the present invention.
Figure 30:
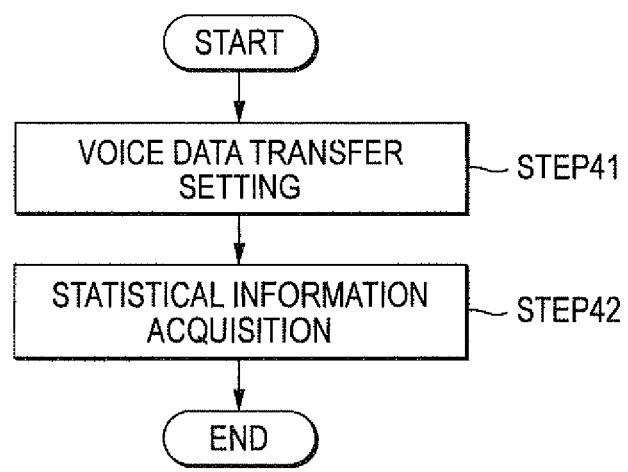
FIG. 30 is a flowchart illustrating a transfer start process of the position-registered radio base station device (of a handover source) according to the first embodiment of the present invention.
Figure 31:
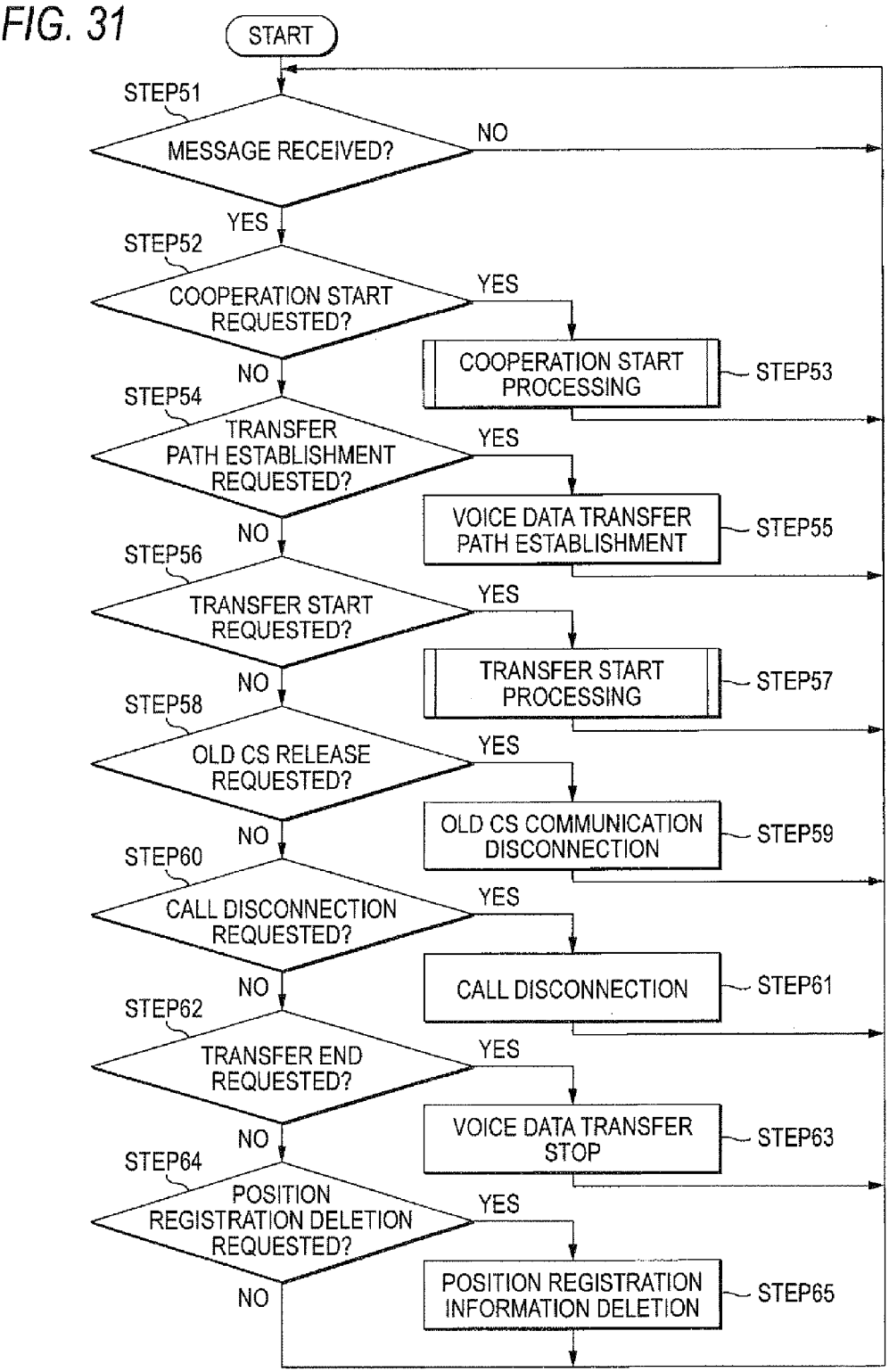
FIG. 31 is a flowchart illustrating processing of the position-registered radio base station device according to the first embodiment of the present invention.

The processing conducted by the radio cell station CS having the CS cooperation according to the first embodiment as described above will be described with reference to flowcharts of FIGS. 27 to 31 from different viewpoints. FIG. 27 is a flowchart illustrating processing of a radio cell station of a handover destination according to the present invention. FIG. 28 is a flowchart illustrating a cooperation start process of the position-registered radio cell station (of a handover source) according to the present invention. FIG. 29 is a flowchart illustrating an HO start process of the radio cell station device of a is handover destination according to the present invention. FIG. 30 is a flowchart illustrating a transfer start process of the position-registered radio cell station (of a handover source) according to the present invention. FIG. 31 is a flowchart illustrating processing of the position-registered radio cell station according to the present invention.

(Processing in Radio Cell Station CS of Handover destination)

As illustrated in FIG. 27, in a wait state, the radio cell station CS of the handover destination checks whether a message is received, or not (step 1). If no message is received, the processing is again returned to the wait state. If the message is received, different processing is conducted according to the kind of message selected from (1) a handover request, (2) a call connection notice, (3) a call end request from the radio personal station PS, (4) a call disconnection notice from a partner, or (5) a position registration request. If the received message is (1) the handover request, the radio cell station CS transmits the cooperation start request to the radio cell station CS of the handover source a current position of which has been registered (step 2). The cooperation start processing implemented by the radio cell station CS of the handover source is executed according to the flowchart of FIG. 28.

<(1) Handover Request>

As illustrated in FIG. 28, when receiving the handover request, the radio cell station CS of the handover source confirms a call state such as a channel use status (step 21). In this confirmation processing (step 22), the radio cell station CS conducts cooperation provision processing so as to accept the transfer of data if there is a calling call (step 23), and the processing is advanced to step 3 in FIG. 27. If there is no calling call, the processing is advanced to step 3 in FIG. 27 as it is because the data transfer is enabled.

In the cooperation start processing of FIG. 28, if the handover source is calling (step 3), the handover processing from the handover source to the handover destination is conducted (step 4). If the handover source is not calling, since the transfer cannot be yet started, the radio cell station CS issues a radio channel switching request to the radio personal station as it is (step 5), and issues an old CS release request of the radio cell station CS which is the handover source (step 6). Thereafter, the processing is returned to step 1 for waiting.

In the handover start processing of step 4, as illustrated in FIG. 29, the radio cell station CS issues a transfer path establishment request to the radio cell station CS a current position of which has been registered (step 31), and then issues a transfer start request (step 32).

When the transfer start request is conducted, the radio cell station CS executes the transfer with respect to the radio cell station CS of the handover destination. Therefore, as illustrated in FIG. 30, the radio cell station CS of the handover source sets voice data transfer (step 41), and acquires statistical information (step 42). Thereafter, the radio cell station CS of the handover destination sets the statistical information as illustrated in FIG. 29 (step 33). If the radio cell station CS confirms whether the cooperation provision processing of step 23 has been completed, or not (step 34). If completed, the handover start processing of step 4 is completed.

The processing of the radio cell station CS of the handover destination as described above is conducted as described with reference to the sequences of FIGS. 11, 13, and 16.

<(2) Call Connection Notice>

Also, if the message received in FIG. 27 is (2) the call connection notice, the processing is conducted as described in the sequence of FIG. 18 when the message is transmitted from the radio personal station PS, and also as described in the sequence of FIG. 20 when the message is transmitted from the partner, and the handover is conducted (step 7). This processing is conducted as described in step 4 and FIG. 29. Thereafter, the processing is returned to step 1 for waiting.

<(3) Call End Request from Radio Personal Station PS>

A case in which the message received in FIG. 27 is (3) the call end request from the radio personal station PS will be described. When the radio personal station PS becomes on-hook, the radio cell station CS of the handover destination issues a call end request to the radio cell station CS a position of which has been registered (step 8), also issues a transfer end request (step 9), and conducts a position registration deletion request (step 10). Then, the radio cell station CS per se of the handover destination issues a position registration request to the management device ME (step 11), and the processing is returned to step 1 for waiting.

The detailed sequence of the radio cell station CS of the handover destination is conducted as described with reference to FIGS. 12, 14, 17, 19, and 21. The position registration is not conducted when the call is completed, and the position registration processing is not conducted during the handover.

<(4) Call Disconnection Notice from Partner>

If the message received in FIG. 27 is (4) the call end request from the partner, the radio cell station CS issues the transfer end request to the radio cell station CS a current position of which has been registered (step 9). After the radio cell station CS issues the position registration deletion request (step 10), the radio cell station CS conducts the position registration request, and the processing is returned to step 1 for waiting. This sequence is conducted as described in the sequence of FIG. 22.

<(5) Position Registration Request>

If the message received in FIG. 27 is (5) the position registration request, it is determined whether the position registration of the radio personal station PS has been conducted previously, or not (step 12). If the position registration has been conducted within the same cell previously, the radio cell station CS is positionally registered in the management device ME again (step 14). If the radio cell station CS a position registration of which has been conducted previously is a different radio cell station CS, the radio cell station CS issues the position registration deletion request for deleting the position registration of the different radio cell station CS (step 13), and conducts the position registration (step 14). This sequence is conducted as described in the sequences of FIGS. 8 and 9.

Thus, in the first embodiment, in the radio cell station CS of the handover destination, if the handover occurs during the call, the position registration is not conducted until the call end request is issued.

(Processing in Registered Radio Cell Station CS)

Subsequently, the processing of the radio cell station CS a current position of which has been registered will be described with reference to the flowchart of FIG. 31. The positionally registered radio cell station CS checks whether the message has been received, or not, in the wait state (step 51). If no message is received, the processing is again returned to the wait state. If the message is received, it is determined whether the message is the cooperation start request, or not (step 52). If the message is the cooperation start request, the cooperation start processing is conducted (step 53), and the processing is returned to Step 51. The cooperation start processing is executed for conducting the cooperation provision processing as illustrated in FIG. 28.

If the received message is not the cooperation start request, it is determined whether the message is a transfer path establishment request, or not (step 54). If the message is the transfer path establishment request, a voice data transfer path is established (step 55), and the processing is returned to step 51.

If it is determined that the message is not the transfer path establishment request in step 54, it is determined the received message is the transfer start request, or not (step 56). If the received message is the transfer start request, the transfer start processing of FIG. 30 is conducted (step 57), and the processing is returned to step 51. If the message is not further the transfer start request, it is checked whether the message is an old CS release, or not (step 58). If the message is the old CS release, the old CS communication is disconnected (step 59), and the processing is returned to step 51.

Then, it is determined whether the received message is a call disconnection request, or not (step 60). If the received message is the call disconnection request, call disconnection is conducted (step 61), and the processing is returned to step 51. If the received message is not the call disconnection request, it is determined whether the message is a transfer end request, or not (step 62). If the message is the transfer end request, a voice data transfer is suspended (step 63), and the processing is returned to step 51.

Further, it is determined whether the received message is a position registration deletion request, or not (step 64). If the message is the position registration deletion request, position registration information is deleted (step 65), and the processing is returned to step 51. If the message is not the position registration deletion request, the processing is returned to step 51 as it is.

As described above, the positionally registered radio cell station CS is cooperated with the CSs according to the contents of the received message along the procedure in turn. When the CS cooperation is completed, the position registration continued from the call start to the call end is deleted.

As described above, in the radio cell station, the handover control system, and the handover control method according to the first embodiment of the present invention, with the cooperation between the radio cell stations, even if the handover is conducted during the call, the position registration is not conducted at that time, and the position registration can be conducted when the call is finally ended. Moreover, the efficiency of the communication path can be enhanced. Seamless handover can be realized while reducing the number of position registrations during the call, without making the general-purpose management device having the registration server and the partner terminal aware of handover.

INDUSTRIAL APPLICABILITY

The radio base station device according to the present invention can be applied to a radio base station that conducts handover control in a cell system. The handover control system and the handover control method according to the present invention can be applied to the radio base station and the management device connected thereto.

DESCRIPTION OF REFERENCE SYMBOLS

CS radio cell station (radio base station)
PS radio personal station (radio terminal)
ME management device ME
11 antenna
12 radio control unit
13 voice codec unit
14 network control unit
14*a* transfer destination management unit
14*b* RTP information management unit
15 call control unit
15*a* call information management units
16 memory
17 base station control unit
17*a* determination unit
18 RSSI

The invention claimed is:

1. A radio base station device that relays a call connection of a radio terminal to a management device, comprising:
   a call connection control section for controlling the call connection of the radio terminal; and
   a position registration request section for requesting, of the management device, a position registration that associates identification information on the radio terminal with identification information on the radio base station device,
   wherein if the call connection control section receives a handover request from the radio terminal that conducts the call connection through another radio base station device, then the call connection control section controls the call connection of the radio terminal in such a manner that the radio base station device and the another radio base station device both relay the call connection of the radio terminal to the management device; and
   wherein while the radio base station device and the another radio base station device both relay the call connection of the radio terminal to the management device, the position registration request section does not request the position registration of the management device, and if the call connection relayed, to the management device, by both the radio base station device and the another radio base station device is ended, then the position registration request section requests the position registration of the management device.

2. The radio base station device according to claim 1, wherein a call fanned by the call connection includes at least one of a voice call and a data call.

3. The radio base station device according to claim 1, wherein the call connection control section controls a plurality of call connections generated by respective radio terminals at the same time for at least a given time; and
   wherein the position registration request section does not request the position registration of the management device while at least one of the call connections is conducted, and requests the position registration of the management device if all of the plurality of call connections are ended.

4. The radio base station device according to claim 3, wherein the call formed by the plurality of call connections controlled at the same time includes at least one call state.

5. The radio base station device according to claim 4, wherein the call formed by the plurality of call connections controlled at the same time further includes a hold state.

6. The radio base station device according to claim 1, wherein the call connection control section requests the handover if a reception level of a signal strength becomes a threshold value or lower.

7. The radio base station device according to claim 1, wherein a call connection control section of the another radio base station device issues a position registration deletion notice to the radio base station device if the call connection that goes through the another radio base station device and the radio base station device is ended.

8. A handover control system comprising:
   a management device for being connectable to a network; and
   a plurality of radio base station devices for being connectable to a radio terminal respectively and for relaying a call connection of the radio terminal to the management device,
   wherein a handover control is conducted if the radio terminal travels from a wireless area of a first radio base station device to a wireless area of a second radio base station device among the plurality of radio base station devices;
   wherein each of the radio base station devices includes:
   a call connection control section for controlling the call connection of the radio terminal; and
   a position registration request section for requesting, of the management device, a position registration that associates identification information on the radio terminal with identification information on the second radio base station device;
   wherein if the call connection control section receives a handover request from the radio terminal that conducts the call connection through the first radio base station device, then the call connection control section controls the call connection of the radio terminal in such a manner that the first radio base station device and the second radio base station device both relay the call connection of the radio terminal to the management device; and wherein while the first radio base station device and the second radio base station device both relay the call connection of the radio terminal to the management device, the position registration request section does not request the position registration of the management device, and if the call connection relayed, to the management device, by both the first radio base station device and the second base station device is ended, then the position registration request section requests the position registration of the management device.

9. A handover control method in which a call connection of a radio terminal is relayed by one of a plurality of radio base station devices to a management device, the method comprising:

if receiving, from the radio terminal, a request for handover from the call connection going through a first radio base station device to the call connection going through a second radio base station device, connecting the call connection of the radio terminal to the management device through both the first radio base station device and the second radio base station device; and requesting no position registration that associates identification information on the radio terminal with identification information on the second radio base station device while the call connection going through both the first radio base station device and the second radio base station device is conducted, and requesting the position registration of the management device if the call connection going through both the first radio base station device and the second radio base station device is ended.

* * * * *